( 12 ) United States Patent
Shinoda et al.

(10) Patent No.: US 8,236,410 B2
(45) Date of Patent: Aug. 7, 2012

(54) REINFORCING FIBER BASE MATERIAL FOR PREFORMS, PROCESS FOR THE PRODUCTION OF LAMINATES THEREOF, AND SO ON

(75) Inventors: Tomoyuki Shinoda, Ehime (JP); Satoru Nagaoka, Matsuyama (JP); Nobuo Asahara, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 1014 days.

(21) Appl. No.: 12/280,903

(22) PCT Filed: Feb. 21, 2007

(86) PCT No.: PCT/JP2007/053157
§ 371 (c)(1),
(2), (4) Date: Aug. 27, 2008

(87) PCT Pub. No.: WO2007/099825
PCT Pub. Date: Sep. 7, 2007

(65) Prior Publication Data
US 2009/0068428 A1 Mar. 12, 2009

(30) Foreign Application Priority Data
Feb. 28, 2006 (JP) .................................. 2006-052460

(51) Int. Cl.
*B32B 7/02* (2006.01)
(52) U.S. Cl. ........................ 428/212; 428/220; 423/447.1
(58) Field of Classification Search .................. 428/212, 428/220; 423/447.1
See application file for complete search history.

(56) References Cited

U.S. PATENT DOCUMENTS
5,741,574 A * 4/1998 Boyce et al. .................. 428/119
(Continued)

FOREIGN PATENT DOCUMENTS
JP H9-508082 10/1994
(Continued)

OTHER PUBLICATIONS
International Search Report for International Application No. PCT/JP2007/053157 dated Apr. 3, 2007.

*Primary Examiner* — David R Sample
*Assistant Examiner* — Lawrence Ferguson
(74) *Attorney, Agent, or Firm* — RatnerPrestia

(57) ABSTRACT

The invention provides (1) a reinforcing fiber base material having a weave constituted of both reinforcing fiber filaments arranged in one direction in parallel with each other and auxiliary yarns arranged in another direction, which satisfies the relationship: $L=H/\cos\theta$ (wherein L is the length of auxiliary yarn covering one reinforcing fiber filament and H is the width of the filament as determined in such a state where the reinforcing fiber filaments are unified only with the auxiliary yarns; and $3°\leq\theta$ (in-plane shear strain)$\leq 30°$) and wherein 2 $g/m^2$ to 40 $g/m^2$ of an adhesive resin having a glass transition temperature between 0° C. and 95° C. is adhesed to at least one side thereof in spots, lines, or discontinuous lines; (2) a laminate obtained by laminating layers of the above reinforcing fiber base material, wherein the adhesive resin adhesed to each layer of base material partially bonds to a facing layer of base material over the whole surface thereof, with the maximum length of each bonding joint being not less than 1 mm and not more than the width H of a reinforcing fiber filament; and (3) a preform, obtained by shaping the laminate, having a reinforcing fiber volume fraction (Vpf) of 45% to 62%.

4 Claims, 7 Drawing Sheets

U.S. PATENT DOCUMENTS

2004/0170554 A1 * 9/2004 Wadahara et al. ......... 423/447.2

FOREIGN PATENT DOCUMENTS

| JP | 11-509280 | 8/1999 |
| JP | 2003-82117 A | 3/2003 |
| JP | 2004-36055 | 2/2004 |
| JP | 2004-218133 | 8/2004 |
| JP | 2005-29781 A | 2/2005 |
| JP | 2005-280348 A | 10/2005 |
| WO | WO 96/13366 | 5/1996 |

* cited by examiner

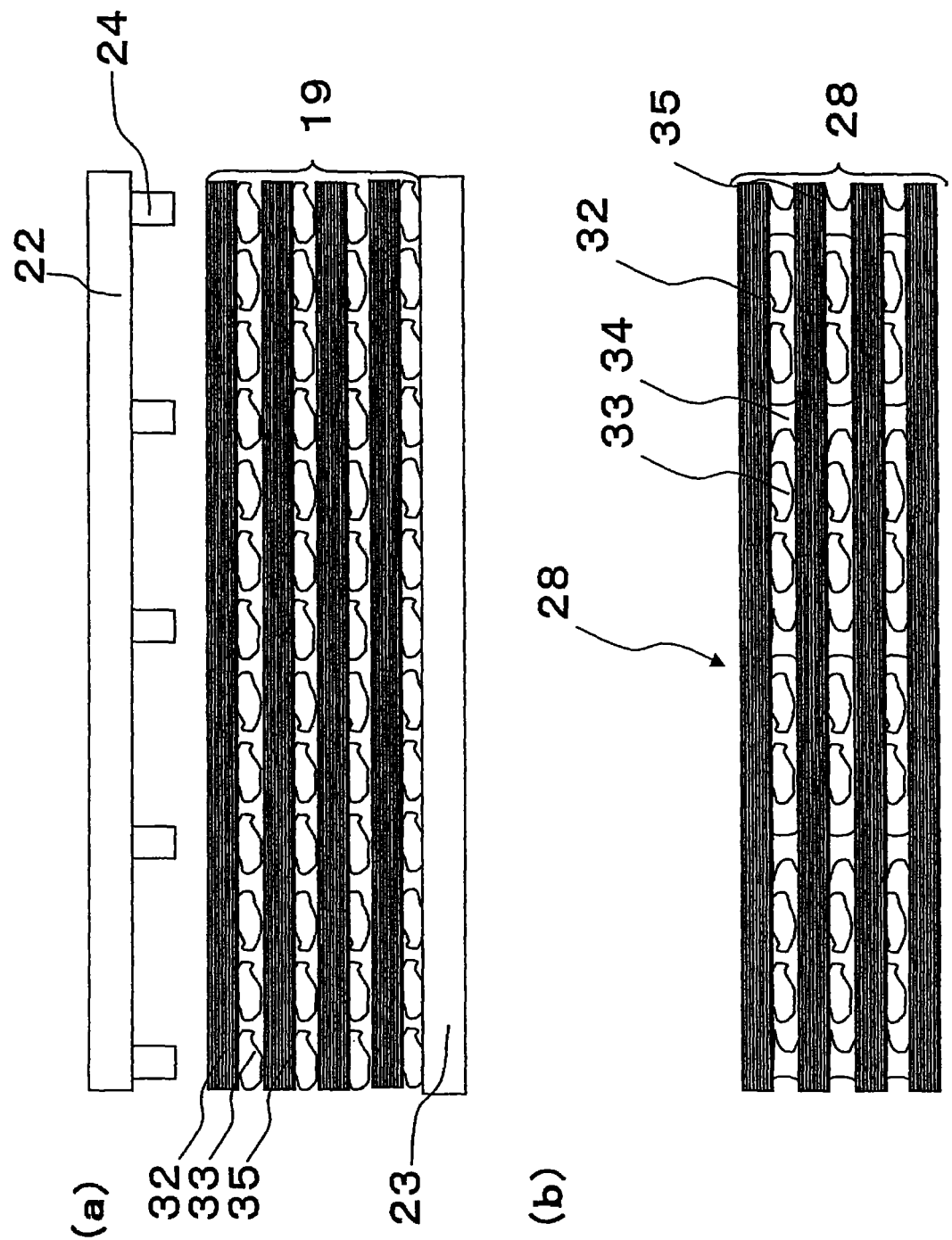

US 8,236,410 B2

REINFORCING FIBER BASE MATERIAL FOR PREFORMS, PROCESS FOR THE PRODUCTION OF LAMINATES THEREOF, AND SO ON

This is a U.S. National Phase application of application number PCT/JP2007/053157, filed Feb. 21, 2007, (which is incorporated herein by reference in its entirety), which claims priority benefit of JP 2006-052460 filed Feb. 28, 2006.

TECHNICAL FIELD

The present invention relates to a reinforcing fiber base material used in the production of fiber-reinforced composite materials by the resin transfer molding process (may be abbreviated hereinafter as the RTM process).

In addition, the present invention further relates to the following: a reinforcing fiber base material laminate obtained by laminating and partially bonding a plurality of layers of the reinforcing fiber base material; a preform made of the reinforcing fiber base material laminate; and fiber-reinforced plastic obtained by injecting and hardening a matrix resin into the preform.

More particularly, the present invention relates to a reinforcing fiber base material suitable for the production of fiber-reinforced plastic (may be abbreviated hereinafter as FRP) having complex shapes and wherein high strength and high elasticity are demanded, such as for the structural material and components of transport equipment, especially aircraft. In addition, the present invention also relates to a laminate of the reinforcing fiber base material, a preform made from the laminate of the reinforcing fiber base material, an FRP using the preform, and a process for producing the same.

BACKGROUND ART

There is demand for the structural materials constituting transport equipment such as aircraft to amply satisfy certain mechanical characteristics, as well as be lighter in weight and lower in cost. Among these, the shift to FRPs as the primary structural material of components such as the wings, the tailplane, and the fuselage is being investigated in order to achieve reduced weight.

In addition, recently there has been movement toward FRPs as reduced weight in the structural materials of automobiles is being sought, and demand for cost reductions greater than that of aircraft is becoming stronger.

Autoclave molding is known as a typical production process for such FRPs.

In autoclave molding, a pre-preg is used as FRP material, the pre-preg being reinforcing fibers impregnated with a matrix resin in advance. By inserting the pre-preg into a mold in the shape of the component and then laminating, heating, and applying pressure, an FRP is formed.

A characteristic of the pre-preg used herein is that it is possible to control to a high degree the reinforcing fiber volume fraction Vf. This has the advantage of enabling an FRP with excellent mechanical characteristic to be obtained. However, the pre-preg itself is an expensive material that requires refrigeration facilities for storage, and the productivity thereof is low since an autoclave is used. Thus, the pre-preg is also problematic in that molded parts formed therefrom are high in cost.

In addition, in the case wherein the shape of a molded part is that of a C or similar shape, only out-of-plane strain of the pre-preg or a laminate of laminated pre-pregs is sought, whereas in the case wherein the shape of the molded part is spherical, partly spherical, or block-shaped, in-plane shear strain is sought in addition to out-of-plane strain. However, since the reinforcing fibers of the pre-preg are held in place by matrix resin, in-plane shear strain is essentially impossible, and thus the draping of pre-pregs into complex shapes having two-dimensional curvature is extremely difficult.

A method of improving drapability is known wherein, when drape forming a pre-preg like the above into a shape wherein in-plane shear strain is sought, restriction of the reinforcing fibers by the matrix resin is lowered by applying heat to lower the viscosity of the matrix resin. However, since reinforcing fibers in a pre-preg are typically arranged in a uniform and dense manner, the reinforcing fibers are not easily moved due to friction among reinforcing fibers, even when the viscosity of the matrix resin is lowered by heat. For this reason, even though drape formation of a shape that requires out-of-plane strain, such as a C shape, can be improved by applying heat, there is a problem in that draping form is hardly improved for shapes wherein in-plane shear strain is sought, such as a spherical surface or block shape. For this reason, when it is necessary to drape form a shape having two-dimensional curvature, it has been necessary to process the pre-preg, such as by adding precuts. However, if precuts are added, the continuity of the reinforcing fiber is lost, and there is a new problem in that elasticity and strength are lowered.

Meanwhile, resin injection molding processes such as resin transfer molding (RTM) are known to be molding processes that improve FRP productivity and reduce molding costs. In these resin injection molding processes, reinforcing fibers that have not been impregnated with matrix resin are first placed inside a mold and then matrix resin is injected thereinto, thereby impregnating the reinforcing fibers with matrix resin and forming an FRP. The matrix resin is then hardened by heating using an oven or similar equipment.

Since the resin transfer molding process uses dry reinforcing fiber base material, materials costs can be reduced. Furthermore, since an autoclave is not used, molding costs can be reduced.

Normally, in the resin transfer molding process, first a preform that maintains the shape of the final product is prepared, the preform being constructed from dry reinforcing fiber base material that has not been impregnated with matrix resin. After placing the preform inside the mold, matrix resin is injected, thereby forming an FRP.

The preform is obtained by using a mandrel or mold in the shape of the final product, wherein reinforcing fiber base material is laminated on the basis of a predetermined lamination configuration, the laminate being shaped to fit the mandrel or mold.

In the case where the preform is a C shape, essentially only out-of-plane strain is sought for the reinforcing fiber base material or the laminate made of laminated reinforcing fiber base material, whereas in the case where the preform is spherical, partly spherical, or block-shaped, in-plane shear strain is also sought.

Multi-axial woven fabrics, such as woven fabrics having fiber filaments arranged in two axial directions, are known as reinforcing fiber base materials that enable in-plane shear strain. Such woven fabrics form a reinforcing fiber base material by the intersection of reinforcing fiber filaments with each other. As long as the reinforcing fibers are not restricted by auxiliary fibers or similar means, it is possible for the angles whereby the reinforcing fibers intersect to change, thereby enabling in-plane shear strain. However, since the reinforcing fiber filaments are arranged multiaxially, the number of reinforcing fiber filaments in each direction essentially halves in the case of a biaxial woven fabric, for example. Thus, while drapability is excellent compared to unidirectional reinforcing fiber base material, there is a problem in that mechanical characteristics are poor.

In addition, a method is known whereby, in order for the preform made from the reinforcing fiber base material to maintain the shape of the final product or a shape close to that of the final product, the reinforcing fiber base material is laminated and draped form in a mandrel or mold having the final shape. Subsequently, the adhesive properties of thermosetting resin or thermoplastic resin are used to unify the reinforcing fiber base material and preserve the preform shape.

For example, a method has been proposed wherein an adhesive agent that contains a thermosetting resin is adhesed to a reinforcing fiber base material, and after laminating the reinforcing fiber base material on the basis of a predetermined lamination configuration, ample pressure is applied to the laminate, thereby obtaining an FRP using a preform that can maintain product shape even after pressure release (cf. Patent Literature 1).

However, according to the above proposal, the laminate of reinforcing fiber base material is compressed with sufficient pressure to maintain the product shape even after pressure release, and for this reason it is extremely difficult to deform the laminate after applying pressure. For this reason, it is necessary to prepare the preform by applying pressure after first adjusting the shape of the reinforcing fiber base material by draping form in a mold or similar means in the shape of the product. However, in such a method, it is necessary to laminate the reinforcing fiber base material one layer at a time, particularly when draping form the reinforcing fiber base material into a complex shape. For this reason, there is a problem in that the draping form process takes time. Moreover, when trying to drape form a non-unified multi-layer laminate in a mold having a complex shape, trouble can occur, such as the reinforcing fiber base material unraveling during draping form, and thus handling is problematic.

To counter this problem in draping form reinforcing fiber base material into complex shapes, methods have been proposed wherein, for example, an arbitrarily shaped preform is shaped by hanging reinforcing fibers on a large number of parallel pins (cf. Patent Literature 2). In this method, the reinforcing fibers are arranged in a predetermined laminate structure by adjusting the positions of the pins whereon the reinforcing fibers are hung. In addition, a preform of arbitrary width can be obtained by adjusting the distance between pins.

However, when this method is used for members having both considerable thickness and wide surface area, such as structural material for aircraft, it is necessary to arrange a large number of pins and additionally to hang reinforcing fibers many times on the pins. For this reason, there is a problem in that the method requires an inordinate amount of work and time.

In addition, a method has been proposed wherein an FRP is formed using a preform bonded in the direction of the thickness of the reinforcing fiber base material by arranging fibers in the direction of thickness of a laminate formed by laminating reinforcing fiber base material of biaxial woven fabric (cf. Patent Literature 3). In this method, by arranging fibers in the direction of thickness at the portions where strain is not required without arranging fibers in the direction of thickness at the portions where strain is required, drapability is ensured while improving handling. However, in this method, a biaxial woven fabric is used. In a biaxial woven fabric, reinforcing fibers are woven in two directions, and as such the reinforcing fiber count in each direction essentially halved. Moreover, since the vertical fibers and the horizontal fibers have nearly the same fineness, a large amount of crimping in the reinforcing fibers occurs at the intersection points of vertical and horizontal fibers due to fiber bending. As a result, there is a trouble in that the realized mechanical characteristics are approximately only half that of a pre-preg wherein reinforcing fibers are arranged in a unidirectional manner.

Since extremely high mechanical characteristic are demanded of the primary structural material for aircraft in particular, biaxial woven fabric, while excellent in drapability and handling, is problematic in that the mechanical characteristics thereof are insufficient.

This being the case, a unidirectional reinforcing fiber base material combining drapability, mechanical characteristics, and handling, as well as a laminate made by laminating and unifying a plurality of layers of such reinforcing fiber base material, and a preform and FRP made from the same, have not been obtained, and there is a need for technology that satisfies these demands.

Patent Literature 1: Japanese patent application publication (Translation of PCT Application) No. H9-508082
Patent Literature 2: Japanese patent application Kokai publication No. 2004-218133
Patent Literature 3: Japanese patent application Kokai publication No. 2004-36055

SUMMARY OF THE INVENTION

The invention provides a unidirectional reinforcing fiber base material having excellent drapability, mechanical characteristics, and handling characteristics, as well as a laminate, preform, and FRP made by laminating and unifying a plurality of layers of such reinforcing fiber base material while retaining the shapeability of the reinforcing fiber base material. In addition, the invention provides a highly productive, low-cost process for producing such a preform and FRP.

A unidirectional reinforcing fiber base material according to an exemplary embodiment of the present invention has the following configuration (1).

(1) A unidirectional reinforcing fiber base material, having a weave of reinforcing fiber filaments arranged in parallel in a single direction, and auxiliary fibers arranged in at least one other direction, wherein the length L whereby an auxiliary fiber arranged in the at least one other direction crosses a reinforcing fiber filament, the width H of a reinforcing fiber filament, and the in-plane shear strain θ exist in the relationship expressed by equations (I) and (II). Additionally, an adhesive resin having a glass transition temperature Tg between 0° C. and 95° C. is adhesed to the surface of the unidirectional reinforcing fiber base material on at least one side thereof, the amount of adhesive resin being between 2 g/m² and 40 g/m² and adhesed in spots, lines, or discontinuous lines.

$$L = H/\cos\theta \quad (I)$$

$$3° \leq \theta \leq 30° \quad (II)$$

In addition, a reinforcing fiber base material laminate according to an exemplary embodiment of the present invention has the following configuration (2).

(2) A planar reinforcing fiber base material laminate, formed by laminating a plurality of layers of the unidirectional reinforcing fiber base material according to (1), wherein the adhesive resin adhesed to each layer of unidirectional reinforcing fiber base material partially bonds to a facing layer of reinforcing fiber base material over the entire surface thereof. Additionally, the maximum length of each bonding joint is not less than 1 mm and not greater than the width H of a reinforcing fiber filament.

Furthermore, a more specifically preferable reinforcing fiber base material laminate according to an exemplary embodiment of the present invention has the following configuration (3).

(3) The reinforcing fiber base material laminate according to (2), wherein the spacing between respective bonding joints is not less than the width H of a reinforcing fiber filament and not greater than 100 mm.

In addition, a preform according to an exemplary embodiment of the present invention has the following configuration (4).

(4) A preform formed by draping the reinforcing fiber base material laminate according to (2) or (3), the preform having a reinforcing fiber volume fraction Vpf in the range of 45% to 62%.

Furthermore, a more specifically preferable preform according to an exemplary embodiment of the present invention has the following configuration (5).

(5) The preform according to (4), wherein the layers of reinforcing fiber base material are bonded together by the adhesive resin over their entire surfaces.

In addition, a fiber-reinforced plastic according to an exemplary embodiment of the present invention has the following configuration (6).

(6) A fiber-reinforced, molded plastic product, obtained by injecting, impregnating, and hardening a matrix resin into the preform according to (4) or (5), and wherein the reinforcing fiber volume fraction Vpf of the molded plastic product is in the range of 45% to 72%.

In addition, a process for the production of a reinforcing fiber base material laminate according to an exemplary embodiment of the present invention has the following configuration (7).

(7) A process for the production of a reinforcing fiber base material laminate that produces a laminate via at least the following steps (A) through (F):

(A) cutting the unidirectional reinforcing fiber base material according to (1) into a predetermined shape;

(B) laminating the unidirectional reinforcing fiber base material that was cut into a predetermined shape by successively transporting and disposing layers thereof in a planar manner on the basis of a predetermined lamination configuration;

(C) intermittently transporting the laminate obtained in the laminating step (B) to a heating step;

(D) heating the laminate transported in the transporting step (C);

(E) press-bonding the laminate by applying pressure to only predetermined locations on the laminate using a press-bonding jig, and bonding together layers of the reinforcing fiber base material at the pressure points throughout the direction of thickness by means of the adhesive resin adhesed to the surface of the reinforcing fiber base material; and (F) cooling the laminate.

Furthermore, a more specifically preferable process for the production of a reinforcing fiber base material laminate of the present invention has any of the following configurations (8) through (17).

(8) The process for the production of a reinforcing fiber base material laminate according to (7), wherein, in the laminating step (B), reinforcing fiber base material is transported and disposed such that the lengthwise planar edge of a sheet of reinforcing fiber base material aligns with the lengthwise planar edge of another sheet of reinforcing fiber base material constituting a layer of reinforcing fibers oriented in an identical direction thereto, thereby producing a continuous reinforcing fiber base material laminate.

(9) The process for the production of a reinforcing fiber base material laminate according to (7) or (8), wherein, in the laminating step (B), a robot arm is used to transport and dispose the reinforcing fiber base material cut in the cutting step (A), such that the angular deviation of the reinforcing fiber base material is within 10, and additionally, the gap between adjacent sheets of reinforcing fiber base material in the same layer is within 3 mm.

(10) The process for the production of a reinforcing fiber base material laminate according to any of (7) to (9), wherein, in the heating step (D), the portions of the reinforcing fiber base material laminate to be bonded in the press-bonding step (E) are heated by hot air.

(11) The process for the production of a reinforcing fiber base material laminate according to (10), wherein, in the heating step (D), an adhesive resin adhesed to the surface of a sheet of reinforcing fiber base material on only side thereof is used, and additionally, the heating temperature of the reinforcing fiber base material laminate is higher than the glass transition temperature Tg of the adhesive resin.

(12) The process for the production of a reinforcing fiber base material laminate according to (11), wherein, in the heating step (D), an adhesive resin adhesed to the surface of both sides of a sheet of reinforcing fiber base material is used, and additionally, the heating temperature of the reinforcing fiber base material laminate is equal to or greater than the glass transition temperature Tg of the adhesive resin.

(13) The process for the production of a reinforcing fiber base material laminate according to any of (7) to (12), wherein, in the press-bonding step (E), the press-bonding jig has a plurality of independent pressure points, and additionally, the maximum length of each pressure point is equal to or less than the width H of a reinforcing fiber filament.

(14) The process for the production of a reinforcing fiber base material laminate according to any of (7) to (13), wherein, in the press-bonding step (E), press bonding is conducted with the spacing between nearest-neighbor pressure points of the press-bonding jig being not less than H and not more than 30 mm.

(15) The process for the production of a reinforcing fiber base material laminate according to (13) or (14), wherein, in the press-bonding step (E), the cross-sectional shape of the pressure points of the press-bonding jig is circular, the diameter of the circular cross-section is equal to or less than the width H of a reinforcing fiber filament, and additionally, press-bonding is conducted with the spacing between nearest-neighbor pressure points being not less than H and not more than 30 mm.

(16) The process for the production of a reinforcing fiber base material laminate according to any of (13) to (15), wherein, in the press-bonding step (E), press-bonding is conducted using a press-bonding jig whose pressure points include heating functions.

In addition, a process for the production of a preform according to an exemplary embodiment of the present invention has the following configuration (17).

(17) A process for the production of a preform that produces a preform via at least the following steps (a) through (d):

(a) placing the reinforcing fiber base material laminate according to (2) or (3) into a mandrel;

(b) press-draping the reinforcing fiber base material laminate by applying surface pressure thereto and draping;

(c) conducting heated press-bonding by heating the reinforcing fiber base material laminate while subject to surface pressure, and then bonding together the laminated layers of the reinforcing fiber base material laminate; and (d) cooling the reinforcing fiber base material laminate whose layers have been bonded together.

Furthermore, a more specifically preferable process for the production of a preform of the present invention has the following configuration (18).

(18) The process for the production of a preform according to (17), wherein, in the press-draping step (b), bag material is used during draping, the reinforcing fiber base material laminate being inserted thereinto, wherein the interior of the bag material is evacuated so as to apply a pressure not less than 0.03 MPa and not greater than atmospheric pressure to the reinforcing fiber base material laminate.

In addition, a process for the production of fiber-reinforced plastic according to an exemplary embodiment of the present invention has the following configuration (19).

(19) A process for the production of fiber-reinforced plastic, wherein the preform according to (4) or (5) is placed in a mold having a resin injection port as well as a vacuum suction port, and matrix resin is injected thereinto while the mold is in an evacuated state. After the matrix resin is discharged from the evacuated port, matrix resin injection from the resin injection port is terminated. The discharged amount of matrix resin from the vacuum suction port is then adjusted such that a fiber-reinforced plastic is formed having a reinforcing fiber volume fraction Vf between 45% and 72%.

Furthermore, a more specifically preferable process for the production of fiber-reinforced plastic according to an exemplary embodiment of the present invention has the following configuration (20).

(20) The process for the production of fiber-reinforced plastic according to (19), wherein, after matrix resin injection from the resin injection port has been terminated, vacuum suction is also applied from the resin injection port and the amount of matrix resin discharged from both the injection port and the vacuum suction port is adjusted.

The reinforcing fiber base material of the present invention has excellent drapability, as does the reinforcing fiber base material laminate formed by laminating a plurality of layers of the reinforcing fiber base material of the present invention. For this reason, a preform made from the reinforcing fiber base material laminate is able to provide an FRP having high mechanical characteristics, while in addition a highly productive, low-cost process for the production of such an FRP is also provided.

BRIEF DESCRIPTION OF DRAWINGS

FIG. 8 is a summary schematic view showing bonding conditions between layers of unidirectional reinforcing fiber base material in a reinforcing fiber base material laminate in accordance with an embodiment of the present invention.

REFERENCE NUMBERS

Figure 1:
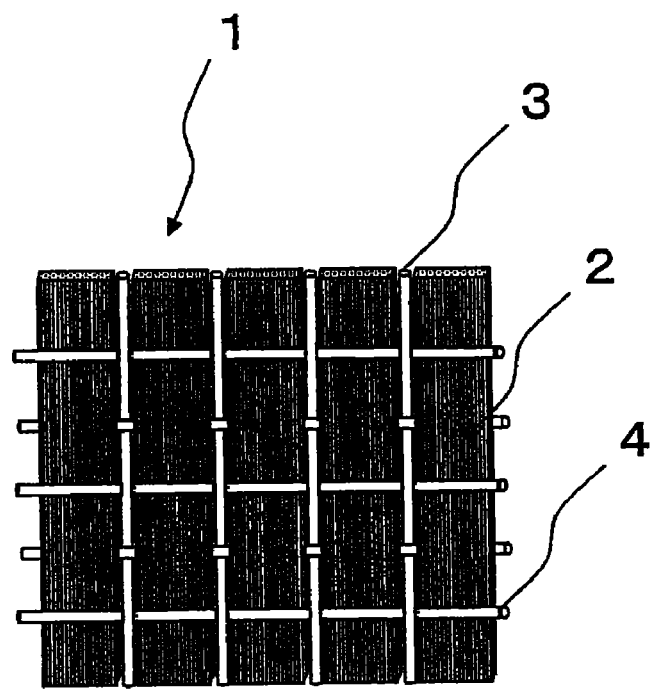
FIG. 1 is a summary plan view showing an example of a unidirectional reinforcing fiber base material in accordance with an embodiment of the present invention (adhesive resin not shown).

1 UNIDIRECTIONAL REINFORCING FIBER BASE MATERIAL
2 REINFORCING FIBER FILAMENT
3 VERTICAL AUXILIARY FIBER
4 HORIZONTAL AUXILIARY FIBER
L LENGTH OF HORIZONTAL AUXILIARY FIBER 4
S GAP BETWEEN ADJACENT REINFORCING FIBER FILAMENTS 2
H WIDTH OF REINFORCING FIBER FILAMENT 2
θ IN-PLANE SHEAR STRAIN
5 AUTOMATIC CUTTER
6 UNIDIRECTIONAL REINFORCING FIBER BASE MATERIAL
7 ROBOT ARM
8 CONVEYOR
9 HAND APPARATUS
10 ROLL
11 AUTOMATIC CUTTER FOR CUTTING −45° UNIDIRECTIONAL REINFORCING FIBER BASE MATERIAL
12 −45° UNIDIRECTIONAL REINFORCING FIBER BASE MATERIAL
13 AUTOMATIC CUTTER FOR CUTTING 900 UNIDIRECTIONAL REINFORCING FIBER BASE MATERIAL
14 90° UNIDIRECTIONAL REINFORCING FIBER BASE MATERIAL
15 AUTOMATIC CUTTER FOR CUTTING −45° UNIDIRECTIONAL REINFORCING FIBER BASE MATERIAL
16 −45° UNIDIRECTIONAL REINFORCING FIBER BASE MATERIAL
17 ROLL
18 SLIDER
19 REINFORCING FIBER BASE MATERIAL LAMINATE
20 OVEN
21 PRESS-BONDING JIG
22 UPPER PRESS-BONDING JIG
23 LOWER PRESS-BONDING JIG
24 PRESSURE POINT
25 TAKE-UP ROLL
26 COOLING SPACE
27 MANDREL
28 REINFORCING FIBER BASE MATERIAL LAMINATE
29 SHEET
30 SEALANT
31 SPACE
32 UNIDIRECTIONAL REINFORCING FIBER BASE MATERIAL

33 ADHESIVE RESIN ADHESED TO UNIDIRECTIONAL REINFORCING FIBER BASE MATERIAL
34 ADHESIVE RESIN ADHESED TO FACING UNIDIRECTIONAL REINFORCING FIBER BASE MATERIAL
35 FACING UNIDIRECTIONAL REINFORCING FIBER BASE MATERIAL

DETAILED DESCRIPTION

The present invention is the result of thorough investigation regarding the foregoing problem; namely, the need for a unidirectional reinforcing fiber base material having excellent shapeability, mechanical characteristics, and handling characteristics. The problem was found to be completely resolved by a unidirectional reinforcing fiber base material having a weave made up of reinforcing fiber filaments and auxiliary fibers that bind the reinforcing fiber filaments, wherein the length of the auxiliary fibers is controlled to be in a particular range.

An embodiment of the reinforcing fiber base material of the present invention will now be described. As described above, the reinforcing fiber base material provided by the present invention is a unidirectional reinforcing fiber base material having a weave that includes reinforcing fiber filaments arranged in a unidirectional manner and auxiliary fibers arranged in at least one other direction. The length L whereby the auxiliary fibers arranged in the at least one other direction cross a single reinforcing fiber filament (hereinafter referred to simply as the auxiliary fiber length L), the width H of a reinforcing fiber filament, and the in-plane shear strain $\theta$ exist in the relationship $L=H/\cos\theta$, with $3°\leq\theta\leq30°$. Additionally, an adhesive resin having a glass transition temperature Tg between 0° C. and 95° C. is adhesed to the surface of the unidirectional reinforcing fiber base material on at least one side thereof.

First, one of the benefits conferred according to aspects of the invention, i.e., the improvement in the shapeability of the reinforcing fiber base material, will be described.

The reinforcing fiber base material according to an exemplary embodiment of the present invention is a base material that can be subject to in-plane shear strain so as to enable satisfactory draping into shapes having two-dimensional curvature, such as spherical surfaces or block shapes.

Embodiments of the present invention will now be described in further detail with the use of the drawings.

FIG. 1 is a summary plan view explaining an embodiment of the unidirectional reinforcing fiber base material of the present invention. In this example, a unidirectional reinforcing fiber base material is shown wherein reinforcing fibers 2, being drawn and arranged in a unidirectional manner, are bound by vertical auxiliary fibers 3 and horizontal auxiliary fibers 4.

The configuration of the unidirectional reinforcing fiber base material of the present invention is not limited to the configuration shown in FIG. 1, and for example may also be a unidirectional reinforcing fiber base material bound only by the horizontal auxiliary fibers 4, without using the vertical auxiliary fibers 3. However, as shown in FIG. 1, by using the vertical auxiliary fibers 3, crimping of the horizontal auxiliary fibers 4 can be minimized, and the reinforcing fiber base material is more easily subject to out-of-plane strain and more pliable when draping. For these reasons, the use of the vertical auxiliary fibers 3 is preferred.

Since the reinforcing fiber filaments 2 of the unidirectional reinforcing fiber base material 1 have a large degree of flexure, excellent composite characteristics can be obtained.

The horizontal auxiliary fibers used in the present invention preferably have, as a primary component, at least one selected from the following: nylon 6 fiber, nylon 66 fiber, nylon 11,12 fiber, polyester fiber, polyaramid fiber, polyphenylene sulfide fiber, polyetherimide fiber, polyethersulfone fiber, polyketone fiber, polyetherketone fiber, polyether ether ketone fiber, and glass fiber. In particular, nylon 66 fiber is preferable as it adheres well to resin and very fine fibers can be obtained therefrom by drawing.

In addition, it is preferable that the horizontal auxiliary fibers of the unidirectional reinforcing fiber base material in the present invention be multifilament fibers. If multifilament fibers are used, it becomes possible to reduce the fineness (i.e., the diameter) of the fibers to that of a single filament. If such fibers are used in an essentially untwisted state, then the horizontal auxiliary fibers in the fabric become aligned parallel to each other without overlapping in the direction of thickness. In so doing, the thickness of the horizontal auxiliary fibers decreases, crimping due to tangles or intersections between the reinforcing fiber filaments and the horizontal auxiliary fibers is reduced, and linearity of the reinforcing fiber filaments in fiber-reinforced plastic is increased, resulting in high mechanical characteristics.

From the same perspective, the width of the horizontal auxiliary fibers should be as fine as possible, the fineness of the horizontal auxiliary fibers preferably being more than 6 dtex and less than 70 dtex, and more preferably, more than 15 dtex and less than 50 dtex. In addition, it is also preferable that the weave density of the horizontal auxiliary fibers be more than 0.3 strands per centimeter and less than 6.0 strands per centimeter, and more preferably, more than 2.0 strands per centimeter and less than 4.0 strands per centimeter. If the weave density of the vertical auxiliary fibers is small, then the fabric may contact the roll or guide bar during weaving or the powder scattering step. This causes disorder in the arrangement of the horizontal auxiliary fibers, and is therefore not preferable. Furthermore, if the weave density of the horizontal auxiliary fibers is large, then crimps between the vertical auxiliary fibers and the reinforcing fibers become large. Moreover, the amount of fiber for the horizontal auxiliary fibers becomes greater, and the heat resistance of the fiber-reinforced plastic is reduced due to moisture absorbance or similar factors, and thus is not preferable.

In addition, it is also preferable that the vertical auxiliary fibers used in the present invention be glass fibers, which do not shrink due to heating when adhesing the adhesive resin to the reinforcing fiber base material or when hardening the resin. In addition, since the vertical auxiliary fibers have essentially no reinforcement effects with respect to fiber-reinforced plastic, thick vertical auxiliary fibers are not necessary, and thus a fineness greater than 100 dtex and less than 470 dtex is preferable. However, from the perspective of securing a resin flow path, the vertical auxiliary fibers are covered, and thus it is preferable that a resin flow path be secured by the twisting of covering fibers. The fibers used as covering fibers may include: nylon 6 fiber, nylon 66 fiber, nylon 11,12 fiber, polyester fiber, polyaramid fiber, polyphenylene sulfide fiber, polyetherimide fiber, polyethersulfone fiber, polyketone fiber, polyetherketone fiber, and polyether ether ketone fiber. In particular, nylon 66 fiber is preferable as it adheres well to resin. A fineness greater than 15 dtex and less than 50 dtex is preferable.

Preferably, high-strength, highly elastic fiber, such as carbon fiber, glass fiber, aramid fiber, or PBO (poly-paraphenylenebenzobisoxazole) fiber is used for the reinforcing fiber filaments 2 constituting the unidirectional reinforcing fiber base material of the present invention. In particular, carbon fiber is one of the strongest and most highly elastic among the above, and thus is more preferable, as an FRP with excellent mechanical characteristics is obtainable therefrom. A carbon fiber having a tensile strength of 4500 MPa or greater as well as an elastic modulus of 250 GPa or greater is even more preferable, as even more excellent composite characteristics are obtainable therefrom.

An exemplary unidirectional reinforcing fiber base material of the present invention, being a unidirectional reinforcing fiber base material 1 with an in-plane shear strain mechanism, will now be described in further detail with the use of FIGS. 2, 3, and 4.

Figure 2:
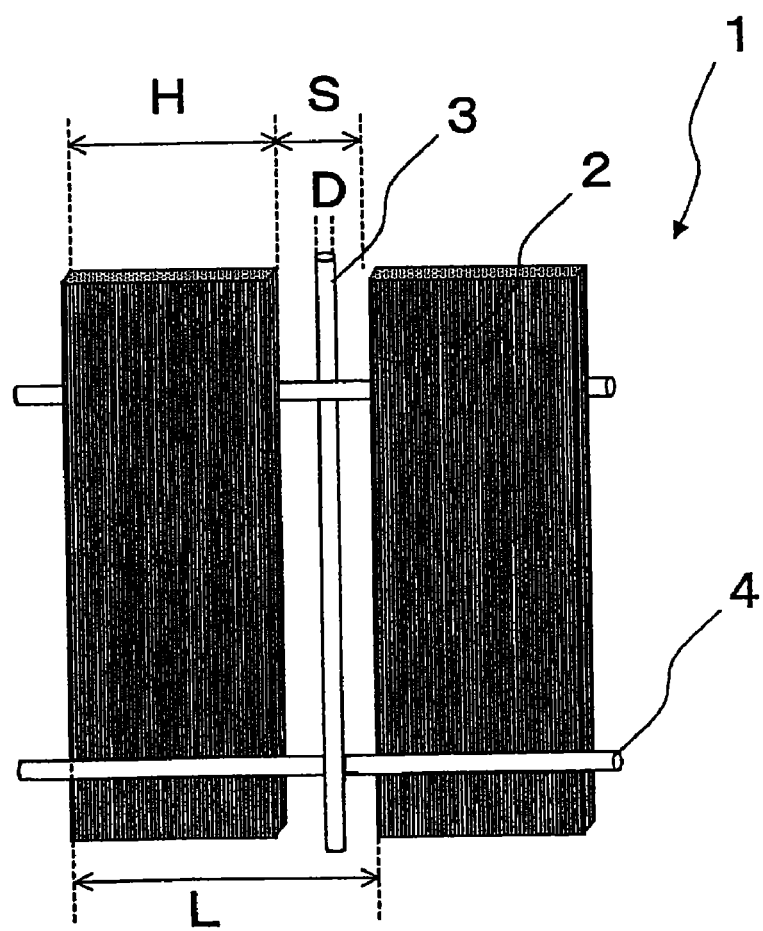
FIG. 2 is an enlarged summary plan view showing an example of a unidirectional reinforcing fiber base material in accordance with an embodiment of the present invention (adhesive resin not shown).

FIG. 2 is an enlarged summary plan view showing the space between adjacent reinforcing fiber filaments 2 of the unidirectional reinforcing fiber base material 1 shown in FIG. 1. Between the adjacent reinforcing fiber filaments 2, a gap S is provided as a result of the length L of a horizontal auxiliary fiber 4. The width of the reinforcing fiber filament 2 herein is H. It is possible to move the reinforcing fiber filament 2 parallel to the reinforcing fiber filaments 2 by an amount equal to the gap S. This movable distance is controlled by the length L of the horizontal auxiliary fiber 4 crossing the reinforcing fiber filament 2. Herein, the length L of the horizontal auxiliary fiber 4 is a length L=H+S, being the sum of the width H of the reinforcing fiber filament 2 and the gap S formed between adjacent reinforcing fiber filaments 2.

Strictly speaking, the length L of a horizontal auxiliary fiber 4 is dependent on the cross-sectional shape of the reinforcing fiber filaments 2. For example, when binding reinforcing fiber filaments 2 having a circular cross-sectional shape, the minimum length of a horizontal auxiliary fiber 4 crossing a single reinforcing fiber filament 2 becomes L=$\pi$r, wherein r is the radius of the circle. However, since the important factor in the present invention is the gap S between reinforcing fiber filaments 2 formed by the length of the horizontal auxiliary fibers 4, the L indicated in the present invention is the length of the horizontal auxiliary fibers 4 as measured when viewing from a perpendicular direction with respect to the surface formed by the lengthwise and widthwise directions of the reinforcing fiber filaments 2. In other words, the length L of the horizontal auxiliary fibers 4 is taken to be the length found by evaluating L=H+S.

Furthermore, the length L of the horizontal auxiliary fibers 4 is the length measured in the state where the reinforcing fiber filaments 2 are unified by the horizontal auxiliary fibers 4 only. The unidirectional reinforcing fiber base material of the present invention includes an adhesive resin having a glass transition temperature Tg between 0° C. and 95° C. adhesed to the surface thereof on at least one side, the amount of adhesive resin being 2 g/m$^2$ to 40 g/m$^2$. For this reason, the reinforcing fiber filaments 2 are unified not only by the horizontal auxiliary fibers 4, but also by the adhesive resin. Since the adhesive resin is applied over the entire surface of the unidirectional reinforcing fiber base material, it may be difficult to measure the gap S between adjacent reinforcing fiber filaments 2 as well as the auxiliary fiber length L. In this case, these quantities may be measured on the unidirectional reinforcing fiber base material before applying the adhesive resin.

In this case, as shown in FIG. 2, the fabric is pulled from both sides in the widthwise direction of the reinforcing fiber filaments, such that no slack occurs in the horizontal fibers 4, and additionally, such that the gap S between adjacent reinforcing fiber filaments 2 is maximized. In this state, a measuring microscope capable of measuring to 0.01 mm precision is used to measure the auxiliary fiber length L at 50 locations. The average value of these measurements is then taken to be the auxiliary fiber length L.

If measurement is not possible with a measuring microscope, measurement may be conducted with a stereoscopic microscope.

If measurement cannot be conducted on the unidirectional reinforcing fiber base material before applying the adhesive resin, measurement similar to the above may be conducted in a state where adjacent reinforcing fiber filaments 2 of the unidirectional reinforcing fiber base material have been released from adhesion by the adhesive resin.

Similarly to the above, the width H of the reinforcing fiber filaments 2 is found by using a measuring microscope capable of measuring to 0.01 mm precision to measure the width H of the reinforcing fibers at 50 locations. The average value of these measurements is then taken to be the width H of the reinforcing fibers.

Figure 3:
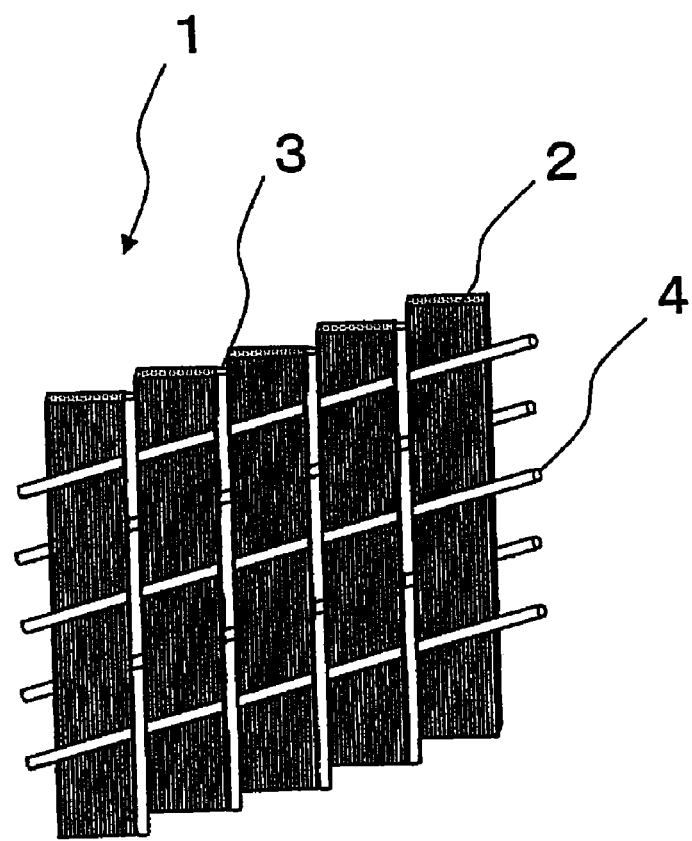
FIG. 3 is a summary plan view showing the state wherein the unidirectional reinforcing fiber base material in FIG. 1 has undergone in-plane shear strain (adhesive resin not shown).

FIG. 3 shows a state wherein the reinforcing fiber filaments 2 have been displaced by the interval of the gap S in a direction parallel to the fiber direction.

Figure 4:
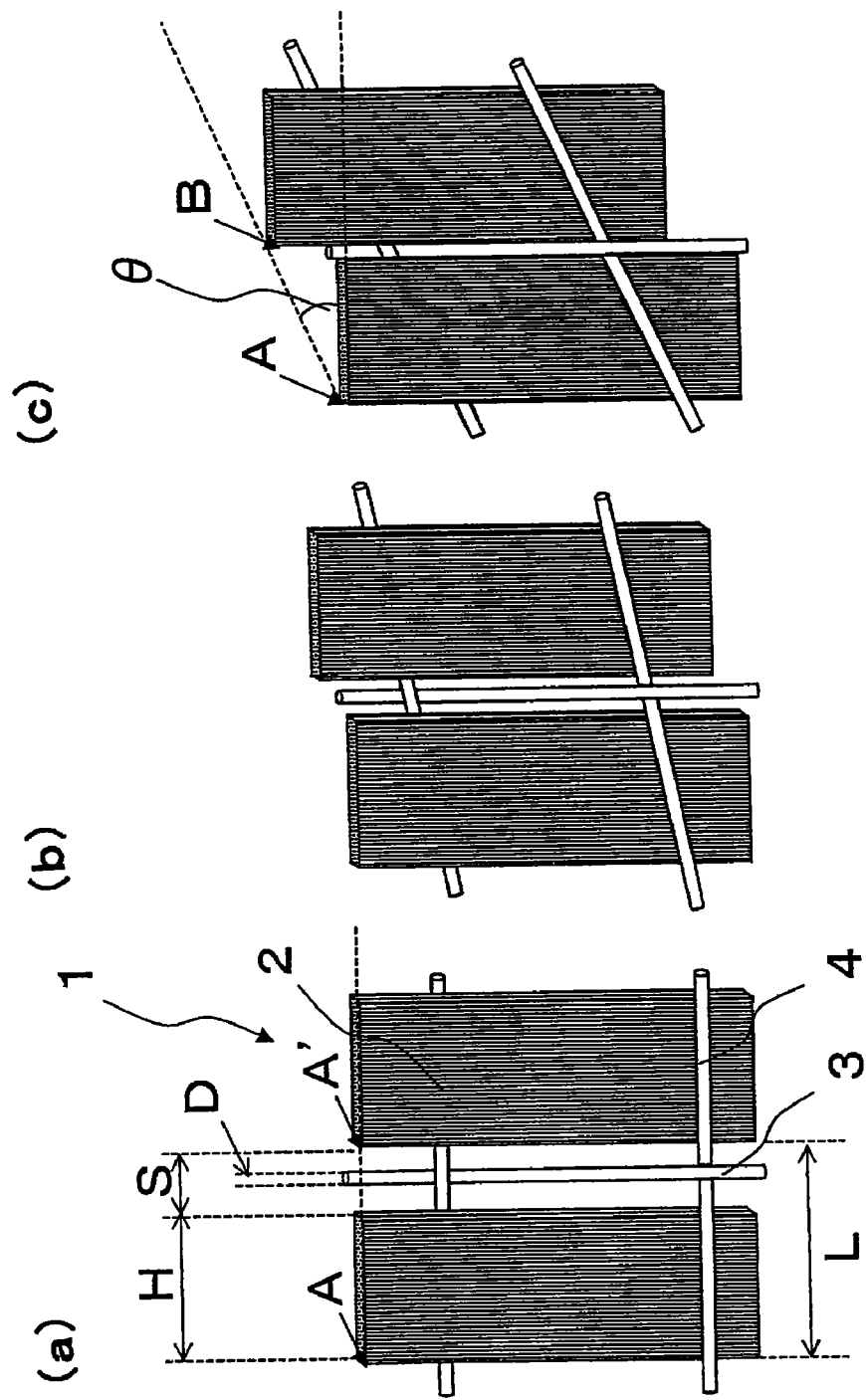
FIG. 4 is a summary plan view showing how the reinforcing fiber filaments are displaced when the unidirectional reinforcing fiber base material in FIG. 1 has undergone in-plane shear strain (adhesive resin not shown).

FIG. 4 is a summary plan view showing how the reinforcing fiber filaments 2 are displaced.

More specifically, FIG. 4(a) shows that a reinforcing fiber filament 2 is able to move parallel to an adjacent reinforcing fiber filament because a gap S is provided between the adjacent reinforcing fiber filaments 2, the gap S being adjusted by the length L of the horizontal auxiliary fibers 4.

In addition, FIG. 4(b) shows that as a reinforcing fiber filament 2 is displaced, the gap S between adjacent reinforcing fiber filaments 2 becomes narrower.

In addition, FIG. 4(c) shows that a reinforcing fiber filament 2 is able to move until contacting an adjacent reinforcing fiber filament.

In this way, the unidirectional reinforcing fiber base material 1 is a base material that can be subject to in-plane shear strain as a result of the reinforcing fiber filaments 2 that constitute the unidirectional reinforcing fiber base material 1 being able to move with respect to each other. In this case, it is preferable to provide vertical auxiliary fibers 3 between the reinforcing fiber filaments 2, as shown in the present example. As a result, even if the reinforcing fiber filaments 2 are displaced and the interval between adjacent reinforcing fiber filaments 2 becomes narrower, the reinforcing fiber filaments 2 do not closely contact each other, thereby enabling a resin injection flow path to be secured between the reinforcing fiber filaments.

The amount of in-plane shear strain in the unidirectional reinforcing fiber base material of the present invention can be expressed as an angle $\theta$, as illustrated in FIG. 4(c). Importantly, the in-plane shear strain $\theta$ exists in the relationship L=H/$\theta$ (herein, $\theta$ is between 3° and 30°) with respect to the width H of a reinforcing fiber filament and the length L an auxiliary thread crosses a single reinforcing fiber filament. The amount of in-plane shear strain herein is an amount that expresses the parallel distance that the reinforcing fiber filaments 2 moved within the region of the gap S. More specifically, when the essentially identical locations A and A' on the adjacent reinforcing fiber filaments 2 in the pre-displacement state (FIG. 4(a)) become A and B in the post-displacement state (FIG. 4(c)), the amount of in-plane shear strain $\theta$ is taken to be the angle formed between the line connecting A and A', and the line connecting A and B.

Strictly speaking, in the case of a reinforcing fiber base material having vertical auxiliary fibers 3 between the reinforcing fiber filaments 2 as shown in FIG. 4, the movable distance of the reinforcing fiber filaments 2 becomes shorter by an amount equal to the width of the vertical auxiliary fibers 3. Thus, the above equation becomes L=(H+D)/cos $\theta$. When $\theta$ herein is less than 3°, the amount of in-plane shear strain of the reinforcing fiber base material is small, and drapability becomes poor. For this reason, such angles are not preferable. On the other hand, when θ is greater than 30°, the gap S between reinforcing fiber filaments becomes too large, leading to not only difficulties in handling, but also flexure of the reinforcing fiber filaments during FRP formation is lost. Because this may lead to reductions in physical properties as an FRP, such angles are not preferable.

The in-plane shear strain θ may also be measured on the unidirectional reinforcing fiber base material before applying the adhesive resin. In this case, as shown in FIGS. 2 and 4(a), the fabric is pulled from both sides in the widthwise direction of the reinforcing fiber filaments, such that no slack occurs in the horizontal fibers 4, and additionally, such that the gap S between adjacent reinforcing fiber filaments 2 is maximized. In this state, the respective lengthwise edges A and A' of the reinforcing fiber filaments 2 are aligned. Subsequently, as shown in FIG. 4(b), the reinforcing fiber filaments 2 on one side of the fabric is displaced upward, and as shown in FIG. 4(c), the reinforcing fiber filaments 2 are disposed such that the gap S is eliminated. A measuring microscope capable of measuring to 0.01 mm precision is used to measure the angle θ in this state, the angle θ being the angle enclosed by the line that connects the lengthwise edges A and B of the reinforcing fiber filaments, and the line that connects the lengthwise edges A and A' of the reinforcing fiber filaments. The in-plane shear strain θ is measured at 50 locations, and the average value of these measurements is then taken to be the amount of in-plane shear strain θ. In addition, as shown in FIG. 4(c), it is also possible to measure the angle of declension of the horizontal fibers to find the amount of in-plane shear strain θ in the case where the horizontal fibers are also displaced in accordance with the displacement of the reinforcing fiber filaments.

Furthermore, an adhesive resin having a glass transition temperature Tg between 0° C. and 95° C. is adhesed to the surface of the unidirectional reinforcing fiber base material of the present invention on at least one side thereof, the applied amount of adhesive resin being between 2 g/m$^2$ and 40 g/m$^2$ and adhesed in spots, lines, or discontinuous lines.

As a result of such adhesive resin being adhesed, the reinforcing fiber base material is laminated on the basis of a predetermined lamination configuration. Additionally, as a result of the layers of the reinforcing fiber base material being bonded to each other, peeling of the layers of the reinforcing fiber base material can be suppressed when forming a preform by shaping the reinforcing fiber base material into a mold having a predetermined shape, thereby greatly improving handling of the preform.

Herein, "adhesing" refers to applying adhesive resin to unidirectional reinforcing fiber base material not having adhesive resin, prior to lamination. "Bonding" refers to unifying the layers of reinforcing fiber base material in a laminate via the adhesive resin, after laminating layers of unidirectional reinforcing fiber base material to which the adhesive resin has been applied. If the Tg of the adhesive resin is less than 0° C., the adhesive resin is sticky at room temperature, and thus the unidirectional reinforcing fiber base material becomes difficult to handle. Meanwhile, if the glass transition temperature Tg of the adhesive resin exceeds 95° C., the adhesive resin, although not sticky at room temperature, must be heated in order to cause layers of the reinforcing fiber base material to bond together, and bonding becomes difficult. The glass transition temperature Tg referred to herein is a value measured by DSC (differential scanning calorimetry).

In addition, for materials that make up the primary structural materials of aircraft in particular, there is demand that the compression after impact (hereinafter abbreviated as CAI) strength be high, such that the material is little affected by collision with flying objects or damage due to dropping tools during repairs.

Since the adhesive resin is adhesed to the surface of the reinforcing fiber base material, lamination is easy compared to the case wherein the adhesive resin is not used, including the lamination of reinforcing fiber base material constituting an FRP, even after FRP molding. Since this lamination includes adhesive resin in addition to matrix resin, it is possible to selectively toughen layers when using a thermoplastic resin with high toughness for the adhesive resin. By toughening such layers, those layers will deform or break when the FRP is impacted, thereby absorbing impact energy and improving CAI strength. For this reason, by optimizing the adhesive resin adhesed to the surface of the reinforcing fiber base material, not only adhesiveness but also impact shock absorbency can be improved.

If the adhesed amount of adhesive resin is less than 2 g/m$^2$, the adhesed amount is too small, and sufficient adhesiveness is not realized. Meanwhile, if the adhesed amount is greater than 40 g/m$^2$, the adhesed amount is too great and the FRP weight increases, thereby impairing weight reduction.

For the adhesive resin adhesed to the surface of the reinforcing fiber base material, a thermosetting resin, a thermoplastic resin, or a mixture of these may be used. In the case where only adhesiveness for a preform is demanded, either a thermosetting resin or a thermoplastic resin may be used singly as the adhesive resin. However, when impact resistance such as CAI strength is demanded, the use of a mixture of a highly tough thermoplastic resin and a thermosetting resin that readily sets and easily bonds to reinforcing fiber base material allows for an adhesive resin that includes a suitable degree of toughness while also being adhesive to the reinforcing fiber base material.

Thermosetting resins which may be used include: epoxy resins, unsaturated polyester resins, vinyl ester resins, and phenol resins. Thermoplastic resins which may be used include: polyvinyl acetate, polycarbonate, polyacetal, polyphenylene oxide, polyphenylene sulfide, polyarylate, polyester, polyamide, polyamid-imide, polyimide, polyetherimide, polysulfone, polyethersulfone, polyether ether ketone, polyaramide, polybenzimidazole, polyethylene, polypropylene, and cellulose acetate.

It is important that the adhesive resin be adhesed to the reinforcing fiber base material in a configuration of spots, lines, or discontinuous lines. In order to adhese the adhesive resin in spots, adhesive resin in a powdered form may be scattered across the surface of the reinforcing fiber base material and then heat-sealed. In addition, in order to adhese the adhesive resin in lines or discontinuous lines, fabric made up of continuous fibers such as a woven or unwoven fabric may be pasted to the surface of the reinforcing fiber base material and then heat-sealed.

Since the unidirectional reinforcing fiber base material of the present invention is provided with gaps between the reinforcing fiber filaments, the reinforcing fiber filaments are made to be movable, and thus the drapability of the unidirectional reinforcing fiber base material is improved. For this reason, it is preferable to adhese the adhesive resin to the entire surface of the reinforcing fiber base material in spots, lines, or discontinuous lines. In so doing, when draping the reinforcing fiber base material into a shape that requires in-plane shear strain, the binding among the reinforcing fiber filaments due to the adhesive resin is easily released, thereby enabling the reinforcing fiber filaments to displace the set gaps therebetween, and enabling sufficient drapability of the reinforcing fiber base material to be realized. For this reason, it is preferable that the maximum adhesed amount of adhesive resin be equal to or less than 40 g/m². From the same perspective, it is further preferable that the maximum adhesed amount of adhesive resin be equal to or less than 30 g/m².

On the other hand, it is not preferable to heat-seal the adhesive resin to the entire surface of the reinforcing fiber base material as a film or similar configuration. In so doing, the reinforcing fiber filaments are not easily displaced, even when gaps between the reinforcing fiber filaments are provided, and sufficient drapability cannot be realized.

In addition, it is preferable to adhese the adhesive resin in the configurations and amounts described above, as doing so enables ideal adhesiveness to be realized during preform manufacturing. Moreover, doing so does not inhibit the impregnation of resin into the reinforcing fiber base material in the direction of thickness during FRP molding.

Furthermore, it is preferable that the present invention be used to produce a planar reinforcing fiber base material laminate, obtained by laminating a plurality of layers of the unidirectional reinforcing fiber base material described above on the basis of a predetermined lamination configuration. The reinforcing fiber base material laminate of the present invention is a material used to manufacture a preform, being different from the preform having the shape of the final molded product. The reinforcing fiber base material laminate of the present invention may also be rolled onto a paper core in order to improve handling as a material and used without problems. The planar laminate referred to herein is a laminate that, even when rolled onto a paper core or similar means, returns to a planar shape when unrolled (i.e., when released from the state of being rolled on the paper core or similar means). When the reinforcing fiber base material laminate is rolled onto a paper core or similar means and then unrolled in this way, some amount of roll warp may remain, and it can be assumed that the laminate will not be strictly planar. However, in such a case, if the shape of the reinforcing fiber base material laminate is that of one-dimensional curvature, and additionally, if the curvature radius of 50% or more of the laminate is equal to or greater than that of the paper core about which the laminate was rolled, then the laminate is assumed to be planar.

Normally, the unidirectional reinforcing fiber base material of the present invention is not used as a single sheet, but is rather molded into a preform by laminating and draping form a plurality of layers thereof on the basis of a predetermined lamination configuration. When molding a preform, it is preferable from a workability standpoint to first make a planar laminate by laminating a plurality of layers of the reinforcing fiber base material on the basis of a predetermined lamination configuration, and then drape form the laminate using a mandrel. However, since the unidirectional reinforcing fiber base material of the related art is poor in drapability, it is difficult to shape the planar laminate using a mandrel that has a complex shape. For this reason, a preform is molded by aligning one layer at a time with the mandrel and laminating on the basis of predetermined lamination configuration. Since the reinforcing fiber base material of the present invention has excellent drapability as described above, it is possible to drape form a laminate made up of a plurality of layers by using a mandrel, even for complex shapes. Thus, using the reinforcing fiber base material laminate of the present invention is preferable, since by doing so workability when molding a preform can be greatly improved, and work time can be shortened.

More specifically, a plurality of layers of unidirectional reinforcing fiber base material are laminated to form a planar reinforcing fiber base material laminate. In other words, the planar reinforcing fiber base material laminate referred to in the present invention is not a preform obtained by draping reinforcing fiber base material into a desired shape and laminating, but rather a planar reinforcing fiber base material laminate obtained by laminating ordinary unidirectional reinforcing fiber base material, and thus may be termed a precursor to a preform.

Furthermore, the adhesive resin adhesed to the reinforcing fiber base material is partially bonded to the facing surface of a sheet of reinforcing fiber base material over the entire surface thereof. Additionally, the bonding joints are formed such that the maximum length of each bonding joint is not less than 1 mm and not more than the width H of a reinforcing fiber filament.

In other words, the reinforcing fiber base material laminate of the present invention is configured such that a portion of the adhesive resin adhesed to the entire surface of a layer of unidirectional reinforcing fiber base material in spots, lines, or discontinuous lines is unified with (i.e., bonded to) the surface of a facing layer of reinforcing fiber base material, wherein the maximum length of a bonding joint is not less than 1 mm and not more than the width H of a reinforcing fiber filament. The adhesive resin partially bonded to a facing layer of reinforcing fiber base material over the entire surface thereof can be determined by inspecting the cross section of the reinforcing fiber base material laminate, this bonded adhesive resin being the result of the adhesive resin adhesed in advance to a layer of reinforcing fiber base material in spots, lines, or discontinuous lines, as well as a subsequent bonding step.

The determination of such bonding conditions will now be described with the use of FIG. 8. FIG. 8(a) shows the state wherein a reinforcing fiber base material laminate 19 is disposed between an upper press-bonding jig 22 having a plurality of independent pressure points 24 and a lower press-bonding jig 23. The reinforcing fiber base material laminate 19 is a four-ply laminate of the reinforcing fiber base material of the present invention, wherein adhesive resin 33 is adhesed to a layer of unidirectional reinforcing fiber base material 32 in spots, lines, or discontinuous lines over the entire surface thereof. The adhesive resin 33 is adhesed to the upper-positioned unidirectional reinforcing fiber base material 32. Since bonding has not occurred between the unidirectional reinforcing fiber base material 32 in the state shown in FIG. 8(a), it can be confirmed if the adhesive resin 33 is adhesed to the entire bottom surface of the unidirectional reinforcing fiber base material 32 by raising the unidirectional reinforcing fiber base material 32. The upper press-bonding jig 22, the lower press-bonding 23, as well as the pre-bond reinforcing fiber base material laminate 19 are heated to a temperature equal to or greater than the glass transition temperature of the adhesive resin used therein. Subsequently, the reinforcing fiber base material laminate 19 is pressed by the upper press-bonding jig 22 and the lower press-bonding jig 23, thereby unifying the laminate. The heating temperature is more preferably +5° C. or greater than the glass transition temperature of the adhesive resin used. FIG. 8(b) shows the reinforcing fiber base material laminate after unification. As a result of heating and pressing, since only the pressure points 24 of the upper press-bonding jig 22 applied pressure to the reinforcing fiber base material laminate 19, the adhesive resin 33 positioned in those locations were pressed against and unified with (i.e., bonded to) the facing surface of the unidirectional reinforcing fiber base material 35. For this reason, there are two types of adhesive resin existing within the fiber-reinforced base material laminate 28: the adhesive resin 33 that was adhesed in advance to the reinforcing fiber base material before bonding, and the adhesive resin 34 that is also bonded to the facing surface of the reinforcing fiber base material 35. The adhesive resin is adhesed to the unidirectional reinforcing fiber base material 32 in spots, lines, or discontinuous lines, and thus while all of the adhesive resin is adhesed to the unidirectional reinforcing fiber base material 32, bonding of the adhesive resin with the facing surface of the reinforcing fiber base material is only partially achieved over the entire surface thereof, and therefore only the adhesive resin 34 is bonded to the unidirectional reinforcing fiber base material 35.

As described in the foregoing, it is preferable that layers of the reinforcing fiber base material of the present invention be bonded partially over the entire surface of the reinforcing fiber base material. On the other hand, it is not preferable for the entire surface to be bonded, as reinforcing fiber filaments cannot move during draping form, and thus the drapability of the reinforcing fiber base material of the present invention cannot be sufficiently realized. From this perspective, it is preferable that the adhesive resin that is adhesed to the surface of the reinforcing fiber base material be partially bonded to another layer, and additionally, that each bonding joint have a maximum length of not less than 1 mm and not more than the width H of a reinforcing fiber filament. If the maximum length is less than 1 mm, then the length of the bonding joints is too short, and bonding is insufficient. On the other hand, if the length of the bonding joints is greater than the width H of a reinforcing fiber filament, then a large number of bonding joints will straddle the space between reinforcing fiber filaments. Since such bonding joints impede movement of the reinforcing fiber filaments during draping form, sufficient drapability cannot be realized, and thus such bonding joint lengths are not preferable.

Furthermore, from the same perspective, it is preferable that the spacing of the bonding joints be not less than the width of a reinforcing fiber filament and not more than 100 mm. If the bonding joint spacing is less than the width of a reinforcing fiber filament, then a large of number of bonding joints will straddle the space between reinforcing fiber filaments, even if the maximum length of the bonding joints is H or less. Thus there is concern that the drapability of the reinforcing fiber base material, and thus the drapability of the reinforcing fiber base material laminate, will be insufficiently realized. On the other hand, if the bonding joint spacing is greater than 100 mm, then the advantages of partial bonding are insufficiently realized because the bonding interval is too wide, and thus such space bonding joint spacing is not preferable.

It is preferable that the reinforcing fiber base material laminate of the present invention have a lamination configuration constituting an FRP. However, if there is a very large number of laminated layers in the lamination configuration constituting a FRP, the reinforcing fiber base material laminate may have a lamination configuration that constitutes a portion of the lamination configuration constituting an FRP. For example, in the case where the lamination configuration constituting an FRP is $[(45/0/-45/90)_X]_S$ (X being an arbitrary integer, and S herein meaning mirror symmetry), a number of reinforcing fiber base material laminates having the lamination configuration (45/0/-45/90) of a repeating laminate unit may be laminated as necessary.

In this way, since the reinforcing fiber base material laminate of the present invention has excellent drapability and handling, a high-quality preform can be acquired therefrom. In the present invention, a preform does not refer to a planar laminate, but rather an intermediate that has been arranged in the shape of the final molded product or a shape close to that of the final product with the use of a mandrel or similar mold.

In the method wherein an FRP is molded by injecting matrix resin into a preform, it is no exaggeration to say that the quality, good or bad, of the FRP is determined by the preform. For this reason, a reinforcing fiber base material and reinforcing fiber base material laminate like those of the present invention, wherefrom a high-quality preform can be acquired, are crucial.

The preform of the present invention is obtained by draping form a reinforcing fiber base material laminate made from the unidirectional reinforcing fiber base material of the present invention described above. Additionally, it is preferable that the reinforcing fiber volume fraction Vpf of the preform be in the range of 45% to 62%.

If the reinforcing fiber volume fraction is less than 45%, then the preform becomes bulky, and the reinforcing fiber volume fraction of the FRP molded product is reduced, and for this reason is not preferable. In addition, if the preform is compressed, for example, so as to reduce the bulk thereof before injecting matrix resin, there occur locations where the filaments become partially serpentine, particularly at locations having curvature. Since this reduces the physical properties of the FRP molded product, such volume fractions are not preferable. On the other hand, if the reinforcing fiber volume fraction Vpf is greater than 62%, it becomes difficult to impregnate with matrix resin, and non-impregnated voids or other defects more often occur, and thus such volume fractions are not preferable. The reinforcing fiber volume fraction of the preform can be improved by first shaping the reinforcing fiber base material laminate using a mandrel or similar means, and subsequently applying pressure such as vacuum pressure or direct pressure to the preform for a fixed amount of time while the preform is in a heated state at or above the glass transition temperature of the adhesive resin. In this case, the reinforcing fiber volume fraction can be improved to the degree that the quantities of heating temperature and pressure are high and the heating and press times are long. It is thus possible to control the reinforcing fiber volume fraction of the preform by appropriately controlling the heating temperature, pressure, and heated pressing time.

Furthermore, the preform of the present invention is characterized such that layers of reinforcing fiber base material are bonded together essentially over their entire surfaces. Such a preform can be manufactured by, for example, first placing the reinforcing fiber base material laminate in a mandrel or similar means, covering the entire laminate with a bagging film, evacuating the space between the bagging film and the laminate, and then applying atmospheric pressure to the entire laminate, thereby firmly pressing the laminate into the mandrel. Alternatively, it is also possible to manufacture a preform by using a mandrel and a press machine to apply pressure to the laminate. In this way, since the preform is draped into the shape of the final product or a shape close thereto, it is necessary to maintain the shape after first draping form until matrix resin is injection and the FRP is formed. For this reason, it is preferable to first drape forming the reinforcing fiber base material or the reinforcing fiber base material laminate into the preform shape using a mandrel or similar means, and subsequently bond the layers of the reinforcing fiber base material together essentially over the entire surfaces thereof. Doing so makes the preform shape more easily maintained. As described above, if the reinforcing fiber base material layers of the preform referred to herein (i.e., the intermediate having the shape of the final product or a shape approximately that of the final product) are bonded together before arranging the shape, movement of the reinforcing fiber filaments is restricted, and as a result sufficient drapability is not realized, and a favorable preform is not obtained.

In this way, in the present invention, when such a planar reinforcing fiber base material laminate is draped into the shape of the preform referred to in the present invention (i.e., the intermediate having the shape of the final product or a shape approximately that of the final product), the following is conducted. In order to realize sufficient drapability (i.e., in-plane shear strain), the adhesive resin does not bond to layers of the reinforcing fiber base material over their entire surfaces, but rather bonds partially at bonding joints having a maximum length not less than 1 mm and not more than the width H of a reinforcing fiber filament. Furthermore, after draping form the preform, the preform shape is maintained by bonding layers of the reinforcing fiber base material over their entire surfaces.

A process for the production of a reinforcing fiber base material laminate of the present invention produces a reinforcing fiber base material laminate via at least the following steps (A) through (F):

(A) cutting the unidirectional reinforcing fiber base material according to claim 1 into a predetermined shape;

(B) laminating the unidirectional reinforcing fiber base material that was cut into a predetermined shape by successively transporting and placing layers thereof in a planar manner on the basis of a predetermined lamination configuration;

(C) intermittently transporting the laminate obtained in the laminating step (B) to a heating step;

(D) heating the transported laminate;

(E) press-bonding the laminate, wherein pressure is only applied to predetermined locations on the laminate by a press-bonding jig, and wherein layers of the reinforcing fiber base material are bonded at the pressure points throughout the direction of thickness by means of the adhesive resin adhesed to the surface of the reinforcing fiber base material; and (F) cooling the laminate.

The predetermined shape of the unidirectional reinforcing fiber base material referred to in (A) is a shape of fixed width and continuous length, wherein the unidirectional reinforcing fiber base material has a fiber orientation in the lamination angle for each layer. By obtaining a reinforcing fiber base material laminate having a fixed width and continuous length, the obtained reinforcing fiber base material laminate can be rolled onto a paper core or similar means and efficiently stored. When the width of a member to be subsequently formed by using the laminate is equal to or less than the width of the reinforcing fiber base material laminate, the laminate may be cut into the shape of the member. In so doing, the laminate may be applied to the creation of all types of members.

The predetermined lamination configuration referred to in (B) is a lamination configuration shared by all members to which the reinforcing fiber base material laminate is applied. By producing a reinforcing fiber base material laminate in a shared lamination configuration, the reinforcing fiber base material laminate can be used for the production of a greater number of members.

Next, an embodiment of the production equipment of the present invention will be described with reference to FIG. 5, and a production process therefor will be described.

Figure 5:
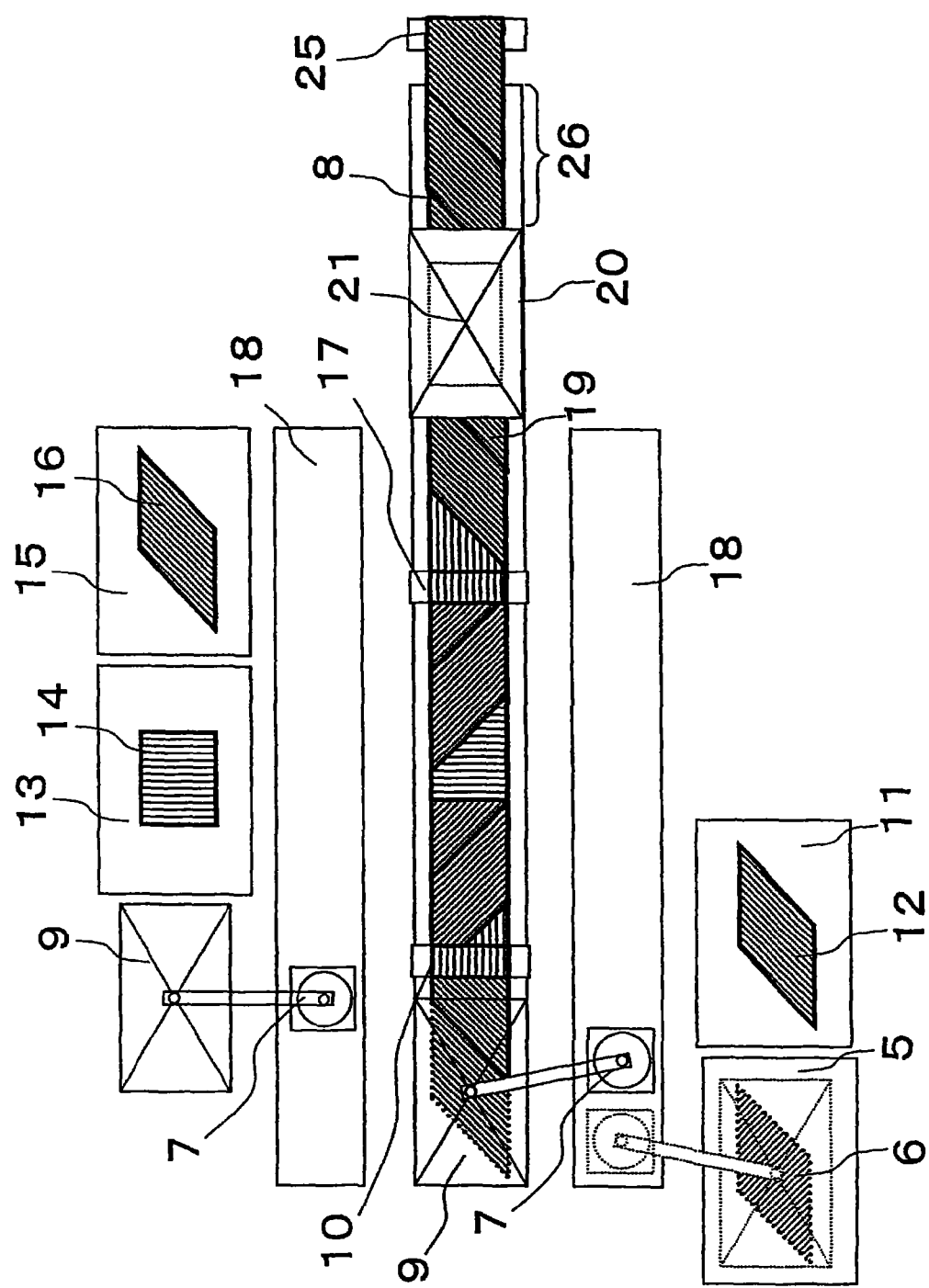
FIG. 5 is a summary schematic plan view showing an example of equipment that produces a unidirectional reinforcing fiber base material laminate in accordance with an embodiment of the present invention.

More specifically, FIG. 5 shows, by way of example, equipment that produces a reinforcing fiber base material laminate having the lamination configuration [45/0/−45/90]$_S$ (S herein meaning mirror symmetry).

It is possible to use a commercially available automatic cutter 5 for the cutting of unidirectional reinforcing fiber base material in the cutting step (A). In the laminating step (B), it is preferable to use a robot arm 7 to transport and place the cut unidirectional reinforcing fiber base material 6 at a predetermined position on a conveyor 8. A hand apparatus 9 able to hold the unidirectional reinforcing fiber base material 6 is attached to the tip of the robot arm 7. The hand apparatus 9 is not particularly limited, so long as the hand apparatus is functional to transport and place the unidirectional reinforcing fiber base material 6 without impairing the quality thereof. For example, a vacuum suction apparatus or blower apparatus may be connected to the hand apparatus, and a technique may be used wherein the unidirectional reinforcing fiber base material 6 is held by suction. Alternatively, a method may be used wherein the unidirectional reinforcing fiber base material 6 is caught and held by pins. A method combining the above two methods may also be applied.

In particular, a hand apparatus that uses a vacuum suction apparatus or a blower apparatus is preferable, since the reinforcing fiber base material is not caught on pins or similar means and thus there is no concern about lowering the quality of the reinforcing fiber base material.

After placing the unidirectional reinforcing fiber base material 6 having a lamination angle of 45° at a predetermined position on the conveyor 8, the conveyor is operated to operate in the forward travel direction. By similarly placing reinforcing fiber base material having a lamination angle of 45° in the space adjacent to the unidirectional reinforcing fiber base material 6 having a lamination angle of 45° that was first placed, reinforcing fiber base material having continuous length and a lamination angle of 45° is prepared. Reinforcing fiber base material having a lamination angle of 0° is then placed on top of the reinforcing fiber base material having a lamination angle of 45° on the basis of the lamination configuration. It is preferable to directly place the 0° reinforcing fiber base material from a base material roll 10 and laminate without cutting. After laminating the 0° reinforcing fiber base material, the conveyor is similarly operated, and −45° unidirectional reinforcing fiber base material 12, having been cut by an automatic cutter 11, is transported and laminated on top of the laminated 45°/0° reinforcing fiber base material. Thereinafter, a 90° unidirectional reinforcing fiber base material 14 cut by an automatic cutter 13, a −45° unidirectional reinforcing fiber base material 16 cut by an automatic cutter 15, and a 0° reinforcing fiber base material from a roll 17 are cut, transported, and laminated on the basis of the lamination configuration.

Placing the reinforcing fiber base material constituting each layer in this way is conducted by conveyor movement, wherein the laminated base material is intermittently moved. In addition, since yet another layer of reinforcing fiber base material to be laminated is placed thereupon at the movement destination, it is preferable that the robot arm 7 be installed upon a slider 18 that is able to move along with the travel of the conveyor 8 in the same direction, such that the robot arm 7 is able to transport respective reinforcing fiber base materials to their predetermined positions on the conveyor.

While all of the reinforcing fiber base material may be cut by a single automatic cutter, it is preferable to cut reinforcing fiber base materials having respective lamination angles using a plurality of automatic cutters, as shown in FIG. 5. In so doing, the time required by the cutting step can be shortened.

In this way, reinforcing fiber base material is repeatedly cut by automatic cutters, transported by a robot arm, laminated, and moved by a conveyor on the basis of a predetermined lamination configuration. Such a method is preferable, as it enables reinforcing fiber base material to be continuously laminated automatically and precisely. It is preferable that the precision be such that deviation from the fiber orientation angle of the unidirectional reinforcing fiber base material is within ±1°, and additionally, such that the gap between adjacent sheets of reinforcing fiber base material in the same layer be between 0 mm and 3 mm. If deviation in the reinforcing fiber orientation angle of the reinforcing fiber base material is greater than 1° with respect to the lamination angle specified by the predetermined lamination configuration, then the desired mechanical characteristics may not be realized, and thus such deviations are not preferable. In addition, depending on the lamination configuration, it may be necessary to place sheets of reinforcing fiber base material adjacent to each other in the same layer. In this case, if the gap between sheets of reinforcing fiber base material is less than 0 mm (i.e., if the sheets are overlapping), then the number of layers increases for those overlapping portions. Since this increases thickness, such overlapping is not preferable. On the other hand, if such gaps are greater than 3 mm, then reinforcing fibers will not be present at those locations. As a result, mechanical characteristics may decrease, or defects may occur such as the formation of portions where the component ratio of resin is significantly large as compared to locations where reinforcing fibers are correctly present. For this reason, such gaps are not preferable.

In the transporting step (C), the laminate obtained in the laminating step (B) is transported to the heating step (D). In FIG. 5, a reinforcing fiber base material laminate 19 having a predetermined lamination configuration and placed on a conveyor 8 is transported to the interior of an oven 20 by intermittently operating the conveyor 8 in the forward travel direction. Since the laminate that has been laminated in a predetermined lamination configuration has not yet been unified, it is difficult to carry the laminate having continuous length without shifting the lamination angles. Consequently, after laminating the reinforcing fiber base material on the conveyor, it is preferable to transport the laminate to the oven in a continuous manner. By adopting such a technique, the laminate can be transported to the heating step and press-bonding step without shifting the lamination angles.

In addition, before the bonding unification in the press-bonding step (E), when there is concern that the lamination angle or other features may be shifted as a result of movement on the conveyor, one preferable embodiment involves temporarily stitching the edges, for example, of the laminate using a sewing machine or similar equipment, thereby temporarily holding the laminate in place. When temporarily stitching, the stitched edges are cut away and removed after bonding predetermined locations over the entire surface of the laminate in the press-bonding step, thereby obtaining the reinforcing fiber base material laminate of the present invention.

In the heating step (D), the laminate obtained in the laminating step (B) is heated to a predetermined temperature to be hereinafter described. It is preferable to use a hot blast oven for the heating apparatus, as doing so enables the reinforcing fiber base material to be heated in a non-contacting manner.

Using an oven 20 like that shown in FIG. 5, the bonding region is selectively heated in the subsequent press-bonding step (E). It is preferable to use such an oven 20 to selectively heat the bonding region, as doing so not only improves heating efficiency, but in addition offers the merits of more easily controlled heating parameters, heating equipment further reduced in size, and easy installation in conjunction with the conveyor, for example.

It is preferable that the press-bonding locations of the laminate be uniformly heated throughout. In particular, it is preferable to heat the press-bonding locations to a uniform temperature in the direction of thickness. If the temperature is not uniform in the direction of thickness, the heating of the adhesive resin adhesed to the surface of the reinforcing fiber base material will not be uniform and irregularities in adhesiveness will occur in the direction of thickness, and thus such non-uniform temperatures are not preferable. Uniform herein means within ±5° C., and more preferably, within ±3° C. The measuring method is not particularly limited, and measurement may be conducted by disposing thermocouples on the top layer and between laminated layers of the laminate at one or more representative heating locations of the laminate, heat-treating the laminate, and then monitoring the heating conditions of the laminate.

In addition, the predetermined temperature when heating is preferably higher than the glass transition temperature Tg of the adhesive resin adhesed to the surface of the reinforcing fiber base material in the case where the adhesive resin is adhesed to the surface of the reinforcing fiber base material on only one side thereof. It is preferable to make the heating temperature higher than the glass transition temperature of the adhesive resin because the adhesive resin thereby softens, and thus the laminate can be reliably bonded at lower pressures in the press-bonding step (E). More preferably, the heating temperature is 5° C. to 20° C. greater than the glass transition temperature Tg.

In addition, since the adhesive resin is adhesed to the surface of the reinforcing fiber base material on only one side thereof, the adhesive resin becomes bonded to the surface of the reinforcing fiber filaments constituting the reinforcing fiber base material in the laminate of reinforcing fiber base material. At temperatures equal to or lower than the glass transition temperature Tg, the adhesiveness of the adhesive resin with respect to the reinforcing fiber filaments is insufficient, and achieving favorable bonding in the subsequent press-bonding step (E) is difficult. For this reason, it is preferable to heat the laminate to a temperature higher than the glass transition temperature Tg of the adhesive resin in the case where the adhesive resin is adhesed to the surface of the reinforcing fiber base material on only one side thereof.

On the other hand, if the adhesive resin is adhesed to the surface of the reinforcing fiber base material on both sides thereof, it is preferable that the heating temperature of the reinforcing fiber base material laminate be equal to or lower than the glass transition temperature Tg of the adhesive resin.

If the adhesive resin is adhesed to the surface of the reinforcing fiber base material on both sides thereof, then the adhesive resin becomes bonded to the adhesive resin adhesed to the surface of the reinforcing fiber base material in the laminate of reinforcing fiber base material. In this case, since the adhesive resin bonds to itself, sufficient adhesiveness can be realized even when heated to temperatures equal to or less than the glass transition temperature Tg. Doing so is preferable, as it enables reinforcing fiber base material laminate to be produced at lower temperatures.

More preferably, the heating temperature of the reinforcing fiber base material laminate is not less than 30° C. below the glass transition temperature Tg of the adhesive resin, and not more than the glass transition temperature Tg.

In the press-bonding step (E), it is necessary to partially bond the adhesive resin adhesed to the surface of the reinforcing fiber base material that constitutes the laminate to reinforcing fiber base material of the facing surface over the entire surface thereof. An exemplary press-bonding step of the present invention is shown in FIG. 6.

Figure 6:
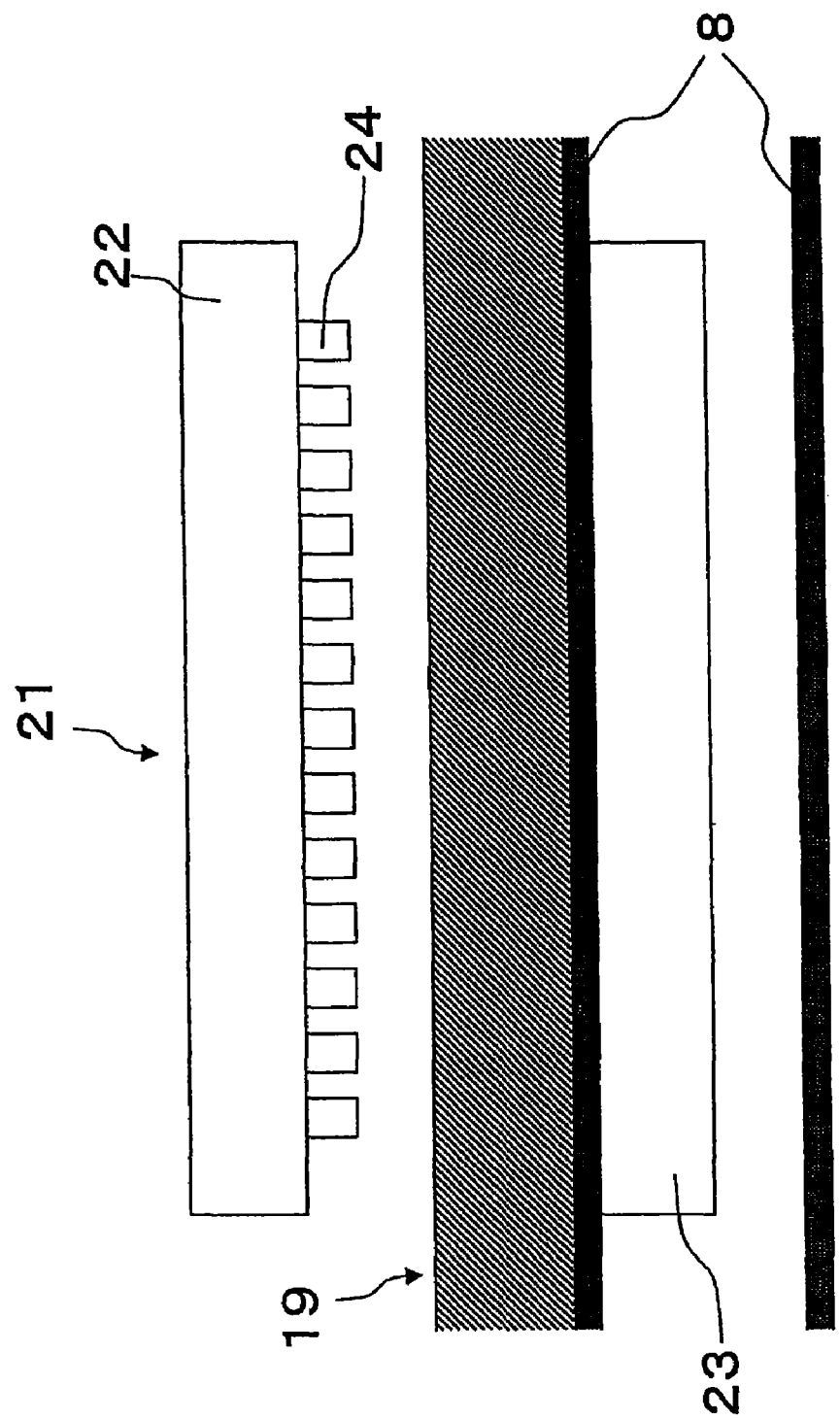
FIG. 6 is a summary schematic view showing an example of the press-bonding step in a process for the production of a reinforcing fiber base material laminate in accordance with an embodiment of the present invention.

More specifically, FIG. 6 shows a cross section of a press-bonding jig 21 installed inside the oven 20 shown in FIG. 5, as well as the reinforcing fiber base material laminate 19 and the conveyor 8.

By operating the conveyor 8, the reinforcing fiber base material laminate 19 on the conveyor 8 is transported to the press-bonding jig 21 installed inside the oven.

It is preferable that the press-bonding jig 21 include an upper press-bonding jig 22 and a lower press-bonding jig 23, and that the upper press-bonding jig 22 have a plurality of protuberant, independent pressure points 24 over the entire surface thereof. By using such a press-bonding jig 21 and controlling the heating parameters in the heating step (D) and the pressure parameters of the press-bonding jig 21, the adhesive resin adhesed to each sheet of unidirectional reinforcing fiber base material constituting the reinforcing fiber base material laminate can be partially bonded to the unidirectional reinforcing fiber base material of the respective facing surface. Furthermore, by making the cross-sectional size of each independent pressure point 24 such that the maximum cross-sectional length is not less than 1 mm and not more than the width H of a reinforcing fiber filament, the maximum length of each bonding joint of the reinforcing fiber base material laminate can be made to be not less than 1 mm and not more than the width H of a reinforcing fiber filament. The cross-sectional shape of the pressure points 24 is not particularly specified, and it is possible to use round, square, rectangular, or variety of other shapes therefor.

Furthermore, it is preferable that the arrangement of the pressure points 24 on the upper press-bonding jig 22 be such that the spacing of the pressure points 24 is not less than the width H of a reinforcing fiber filament and not more than 30 mm. If the spacing of the pressure points 24 is less than H, too many bonding locations are formed on the reinforcing fiber base material laminate, and thus such spacing is not preferable. On the other hand, it is not preferable for the spacing of the pressure points 24 to be greater than 30 mm, as this results in too few bonding locations. In addition, it is preferable that the press-bonding jig 21 be made of metal and have heat-generating functions. The method of heat generation is not particularly limited, and may include jointly providing an electric heater, heated water, or a hot oil line. It is preferable to have the press-bonding jig 21 be made of metal, as doing so allows for improved heating efficiency by the above heat-generating methods or the oven 20. In addition, from the perspective of making adjustments for maintenance or changing the pressure parameters, it is preferable that the pressure points 24 be removable.

In addition, it is preferable that the cross-sectional shape of the pressure points 24 on the upper press-bonding jig 22 be circular, with a diameter that is equal to or less than the width H of a reinforcing fiber filament, and additionally, with a spacing between nearest-neighbor pressure points that is between H and 30 mm.

For example, if the cross-sectional shape of the pressure points is quadrangular or triangular, there is concern that the edges of the vertices of the cross-sectional shape of the pressure points might damage the reinforcing fiber filaments in the press-bonding step, and thus such cross-sectional shapes are not preferable.

On the other hand, if the cross-sectional shape of the pressure points circular, there are no vertices, and thus the press-bonding step can be conducted without the edges of vertices damaging the reinforcing fiber filaments. For this reason, a circular cross-sectional shape is preferable.

Furthermore, it is preferable that the pressure points of the press-bonding jig having heating functions. The mechanism of the heating function may be such that piping for a heat transfer medium flow path is installed in the press-bonding jig, wherein the pressure points of the press-bonding jig are heated by causing a heat transfer medium to flow in the piping for the heat transfer medium flow path, the heat transfer medium having been heated by a tool temperature controller.

In this way, as a result of heating the locations on the laminate of reinforcing fiber base material whereat pressure is to be applied by heated pressure points, the heating time can be shortened compared to the case of heating by hot air such as that from an oven, and additionally, heating temperature control is easy. For this reason, the above heating method is preferable.

In the cooling step (F), bonding is completed by cooling the adhesive resin bonded to each sheet of reinforcing fiber base material that was heated in the heating step (D) and the press-bonding step (E). In FIG. 5, a cooling space 26 is provided between the oven 20 and a take-up roll 25, the cooling space 26 cooling the reinforcing fiber base material laminate to room temperature. After cooling to room temperature and completing the bonding, there is a take-up step wherein the reinforcing fiber base material laminate is wound onto the take-up roll 25. The take-up roll 25 is not particularly limited, so long as the reinforcing fiber base material laminate can be wound thereon. A paper core or similar means having a suitable diameter may be used, the diameter preferably being between 50 cm and 150 cm.

It is preferable to use a conveyor to continuously conduct these steps (A) through (F), as doing so allows for a reinforcing fiber base material laminate having continuous length to be produced.

It is possible to wind the reinforcing fiber base material laminate obtained in this way onto the roll 25 as necessary. In addition, before winding the reinforcing fiber base material laminate as necessary, the edges of the reinforcing fiber base material laminate may be stitched using a sewing machine or similar means, thereby suppressing unraveling of the reinforcing fiber base material laminate due to the strain when winding. In this case, by removing the stitched edges as necessary, a reinforcing fiber base material laminate with predetermined shaping ability can be realized. Needless to say, it is also possible to keep the reinforcing fiber base material laminate in a planar state without winding for storage or use in a subsequent step.

The process for producing a preform of the present invention produces a preform via at least the following steps (a) through (d), specifically:

(a) placing the reinforcing fiber base material laminate into a mandrel;

(b) press-draping the reinforcing fiber base material laminate by applying surface pressure thereto so as to be shaped by the mandrel;

(c) conducting heated press-bonding by heating the reinforcing fiber base material laminate while subject to surface pressure, and then bonding the laminated layers of the reinforcing fiber base material laminate; and (d) cooling the preform made from the reinforcing fiber base material laminate obtained in the heated press-bonding step (c).

In the placing step (a) herein, a reinforcing fiber base material laminate, being obtained by laminating a plurality of layers of reinforcing fiber base material made from unidirectional reinforcing fiber base material, is placed into a mandrel after being cut into a predetermined shape for draping form. Depending on the laminated configuration of the preform to be produced, it is also possible to place and laminate a plurality of reinforcing fiber base material laminates. In addition, it is also possible to place and laminate a reinforcing fiber base material laminate and a single sheet of reinforcing fiber base material.

In the press-draping step (b), after placing the reinforcing fiber base material laminate, surface pressure is applied to the reinforcing fiber base material laminate so as to be draped by the mandrel on the basis of a predetermined laminated configuration. The method whereby surface pressure is applied is not particularly limited, but it is preferable use the vacuum bagging method, wherein the reinforcing fiber base material laminate and the mandrel are sealed using a plastic film or a sheet made from various rubbers. By subsequently evacuating the interior of the seal, the film or sheet presses closely against the reinforcing fiber base material laminate, and the reinforcing fiber base material laminate is draped by the mandrel due to atmospheric pressure. In particular, it is preferable to perform draping form using a sheet made from various rubbers such as silicon rubber or nitrile rubber, as wrinkles are less easily formed compared to the case of using a film, and a preform having excellent surface smoothness can be produced thereby.

Figure 7:
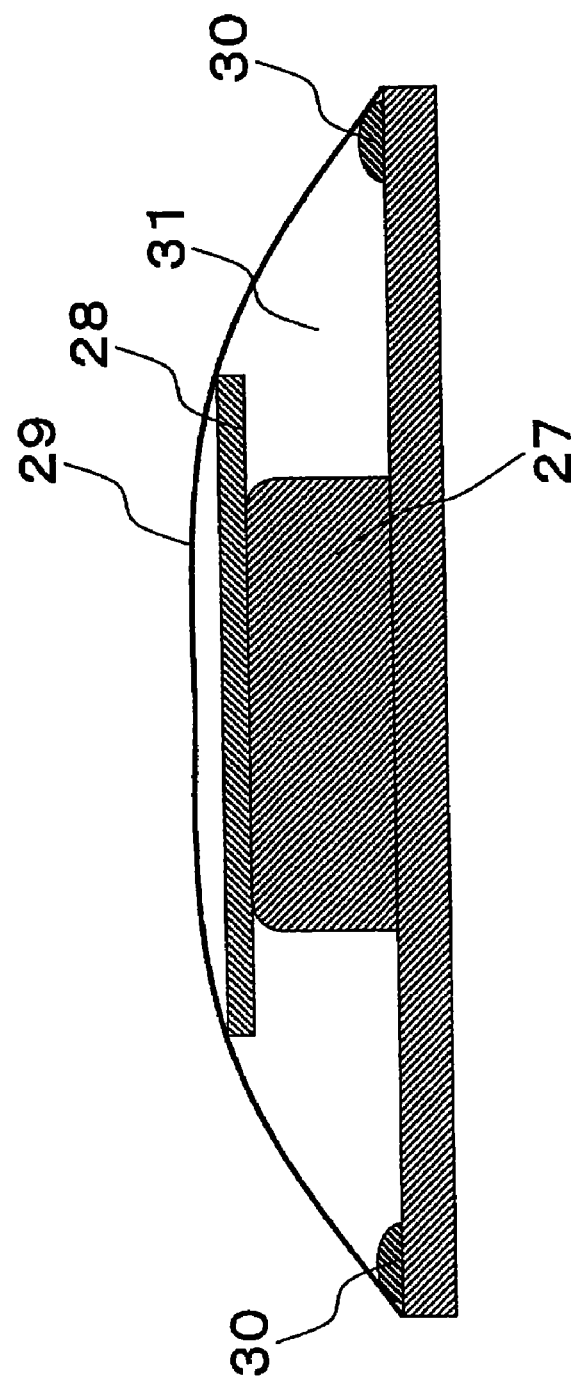
FIG. 7 is a summary explanatory diagram explaining process conditions during production of a preform in accordance with an embodiment of the present invention using the vacuum bagging method.

Hereinafter, the method of producing a preform by the vacuum bagging method will be described in detail with the use of FIG. 7.

First, a reinforcing fiber base material laminate 28 is placed upon a mandrel 27. The surface of the mandrel 27 may be treated with a parting agent, as necessary. After placement, the mandrel and the reinforcing fiber base material laminate 28 are covered with a plastic film or a sheet 29 made from various rubbers, the edges thereof sealed to the mandrel using sealant 30 or similar means. The space 31 formed by the film or sheet and the mandrel is depressurized by vacuum suction using a vacuum pump or similar means. Atmospheric pressure is then applied the reinforcing fiber base material laminate via the sheet 29 to drape form the reinforcing fiber base material laminate.

In particular, it is more preferable to use a sheet made from various rubbers. Since such a sheet is stretched tight by atmospheric pressure, the development of wrinkles is suppressed as compared to a film, thereby allowing a preform with excellent surface smoothness to be formed.

In addition, it is preferable to make preparations such that various sub-materials necessary during the press-draping step (b) and during resin injection for molding can be placed simultaneously. In so doing, resin injection can be conducted immediately after the completion of the series of draping steps.

In this way, a plastic film or sheet 29 made from various rubbers is used to drape form the reinforcing fiber base material laminate 28 by applying atmospheric pressure thereto. This method is preferable, as it allows for uniform pressure to be applied to the reinforcing fiber base material laminate 28, and thus phenomena such as disorder of the reinforcing fibers during press-draping and irregularities in the thickness of the preform can be suppressed.

In the heated press-bonding step (c), surface pressure and heat are applied to the reinforcing fiber base material laminate that was shaped into a preform shape in the press-draping step (b). In so doing, sheets of reinforcing fiber base material in the laminated layers of the reinforcing fiber base material laminate are bonded together over their entire surfaces with the use of adhesive resin adhesed to the surface of the reinforcing fiber base material. Thus, sheets of reinforcing fiber base material can be bonded together after having utilized the shaping ability of the reinforcing fiber base material laminate to create a preform shape in the press-draping step (b). For this reason, the shaping of complex shapes is possible, and additionally, it is possible to produce a preform that is excellent at retaining its shape.

One preferable method of applying heat and pressure to the reinforcing fiber base material laminate involves the following. First, a plastic film or sheet made from various rubbers is used to drape forming the reinforcing fiber base material laminate. Subsequently, while still in the above state, the entire reinforcing fiber base material laminate is inserted into an oven or similar means and heated. This method is preferable, as it allows the preform to be formed by heating as-is in an oven or similar means after the press-draping step (b).

In addition, it is preferable that the heating temperature be equal to or greater than the glass transition temperature of the adhesive resin adhesed to the surface of the reinforcing fiber base material. Doing so is preferable, because by making the heating temperature higher than the glass transition temperature of the adhesive resin, the adhesive resin softens, and thus the preform can be reliably bonded at lower pressures. More preferably, the heating temperature is 5° C. to 20° C. greater than the glass transition temperature Tg. More preferably, the temperature is equal to or greater than the heating temperature in the heating step wherein the reinforcing fiber base material laminate is heated. After the heated press-bonding step (c), the preform is cooled in the cooling step (d). The cooling temperature is preferably less than or equal to the glass transition temperature of the adhesive resin adhesed to the surface of the reinforcing fiber base material. In particular, if the reinforcing fiber base material laminate is heated in the heated press-bonding step (c) to a temperature greater than the glass transition temperature of the adhesive resin, the adhesive resin softens. Thus, when the preform is handled in a state of softened resin, the reinforcing fiber base material layers may shift, and moreover, if the reinforcing fiber base material laminate is draped form in such a way that the adhesive resin contacts the mandrel, there is a high chance that the adhesive resin will adhere to the mandrel, and thus there is concern that the preform may be difficult to remove from the mandrel. For these reason, such heating temperatures are not preferable.

It is possible to use various methods as the cooling method, such as exposing the preform to room temperature after the heated press-bonding step (c), or cooling by passing cold water through the mandrel.

The process for producing an FRP of the present invention involves the following. Matrix resin is injected into a preform of the present invention having a reinforcing fiber volume fraction Vpf between 45% and 62%. After the matrix resin is discharged from a vacuum suction port, injection of matrix resin from an injection port is terminated, and the amount of matrix resin discharged from the vacuum suction port is adjusted so as to form an FRP having a reinforcing fiber volume fraction Vf between 45% and 72%.

More specifically, if the reinforcing fiber volume fraction Vf of the FRP is less than 45%, then the strength and elastic modulus for the FRP will be low, and the FRP will need to be thicker in order to realize set mechanical characteristics. As a result, there is concern that the advantages of reduced weight will be lessened, and thus such volume fractions are not preferable.

On the other hand, if the reinforcing fiber volume fraction Vf is greater than 72%, then the amount of matrix resin will be insufficient, and thus defects such as voids will more easily occur. For this reason, such volume fractions are not preferable.

In addition, in the case where an FRP is formed having a large number of laminated layers, such as 20 laminated layers of reinforcing fiber base material constituting the FRP, then in consideration of the hardening characteristics of the matrix resin, it is preferable to first reserve an amount of time for injecting into the preform, heat the matrix resin to lower the viscosity thereof, and then inject the matrix resin. In addition, it is preferable to simultaneously heat the preform into which the matrix resin is to be injected. When using a preform having a high reinforcing fiber volume fraction Vpf in order to form an FRP with a comparatively high reinforcing fiber volume fraction Vf, there is a tendency for the impregnability of the matrix resin to decrease due to the higher density of reinforcing fibers in the preform. It is thus also preferable in this case to reduce the viscosity of the matrix resin by heating, and then inject the matrix resin to impregnate the preform.

More preferably, after terminating injection of matrix resin from an injection port, vacuum suction is applied from a suction port connected to the injection port, and matrix resin is suctioned and discharged from both the suction port and a conventional vacuum suction port. In addition, it is preferable to adjust the amount of discharged matrix resin so as to form an FRP having a reinforcing fiber volume fraction Vf between 45% and 72%.

When causing the matrix resin to be discharged from the suction port connected to the injection port and/or a conventional vacuum suction port, it is preferable to apply external pressure to the preform so as to discharge the matrix resin in a shorter amount of time.

In addition, the reinforcing fiber volume fraction Vf of the FRP is preferably adjusted to be equal to or greater than and not more than 20% greater than the reinforcing fiber volume fraction Vpf of the preform. It is possible to adjust the reinforcing fiber volume fraction of the FRP by controlling the amount of discharged matrix resin after injecting matrix resin into the preform, using factors such as the time and temperature whereby matrix resin is suctioned from the suction port and/or the vacuum suction port, and furthermore by applying external pressure to the preform.

The "reinforcing fiber volume fraction Vpf of the preform" in the present invention is a measurable value defined as follows, and is a value of the state before matrix resin is injected into the preform.

More specifically, the reinforcing fiber volume fraction Vpf of the preform can be expressed in terms of the thickness (t) of a preform subject to an atmospheric equivalent pressure of 0.1 MPa, using the following equation:

preform reinforcing fiber volume fraction $Vpf = F \times p / \rho / t / 10 (\%)$, wherein
F: material weight ($g/m^2$)
p: number of material layers (sheets)
$\rho$: reinforcing fiber density ($g/cm^3$)
t: preform thickness (mm)

A specific method for measuring the thickness of a preform can be obtained by measuring using the method for measuring thickness described in the testing methods for carbon fiber woven fabrics described in JIS R 7602, but wherein the pressure is changed to 0.1 MPa. In the VaRTM molding process which uses vacuum pressure, in order to inject matrix resin and impregnate the preform while the preform is subject to atmospheric pressure, it is preferable to control the reinforcing fiber volume fraction of the preform while the preform is subject to an atmospheric equivalent pressure of 0.1 MPa. If the preform has a complex shape and measurement on the basis of JIS R 7602 cannot be conducted, then a sample may be cut from the preform and measured. In this case, it is necessary to exercise caution when cutting the sample, so as not to alter the thickness of the preform as a result of cutting. In addition, if sample cutting is also not possible, the thickness of the preform can be measured by conducting the following. A bagging film is used to vacuum bag the preform as well as the preform-mandrel. While the preform is thus subject to atmospheric pressure, the total thickness of the preform, mold, and bagging film is measured, and then the thickness of the mold and the bagging film are subtracted from the total to acquired the preform thickness.

In addition, the "reinforcing fiber volume fraction Vf of the FRP" in the present invention is a measurable value defined as follows, and is a value of the state after matrix resin has been injected into the preform and hardened. More specifically, the measurement of the reinforcing fiber volume fraction Vf of the FRP can be expressed similarly in terms of the thickness (t) of the FRP using the following equation, similar to the above:

FRP reinforcing fiber volume fraction $Vf = F \times p / \rho / t / 10 (\%)$.

Although t is the thickness (mm) of the FRP herein, the other parameters are identical to the parameter values used when evaluating the reinforcing fiber volume fraction Vpf of the preform above.
F: material weight ($g/m^2$)
p: number of material layers (sheets)
$\rho$: reinforcing fiber density ($g/cm^3$)
t: FRP thickness (mm)

If the material weight F, the number of material layers, and the reinforcing fiber density are not known, then the reinforcing fiber volume fraction of the FRP may be measured by using the combustion method, the nitric acid dissolution method, or the sulfuric acid dissolution method on the basis of JIS K 7075. The reinforcing fiber density used in this case is the value measured on the basis of JIS R 7603.

The specific method for measuring the thickness of the FRP is not particularly limited, so long as the method can be used to correctly measure the thickness of the FRP. However, as described in JIS K 7072, it is preferable to conduct measurement using a micrometer prescribed in JIS B7502 or means having equal or greater precision thereto. If the FRP has a complex shape and cannot be measured, then a sample (i.e., a sample for measurement having a certain degree of shape and size) may be cut from the FRP and measured.

The reinforcing fiber base material used in the present invention has adhesive resin adhesed to the surface thereof. The adhesive resin bonds together layers of the reinforcing fiber base material, thereby realizing a function that improves handling properties such as shape-retaining characteristics of the reinforcing fiber base material and the preform, while also realizing a function that improves impact resistance such CAI strength. When improvement in impact resistance by such adhesive resin is expected, it is preferable that layers including adhesive resin be formed between the reinforcing fiber layers after FRP molding.

On the other hand, during FRP production, the reinforcing fiber volume fraction Vf of the FRP can be improved by increasing the amount of discharged matrix resin, but when injecting the matrix resin, there may be cases wherein the matrix resin and/or the preform are heated during injection, as described above. If the heating temperature exceeds the glass transition temperature of the adhesive resin adhesed to the surface of the reinforcing fiber base material, then the adhesive resin may soften, fall away from the surface of the reinforcing fiber base material, and become positioned inside the matrix resin that forms the space between layers of reinforcing fiber base material.

In such a case, if the amount of discharged matrix resin is increased such that the reinforcing fiber volume fraction Vf of the FRP becomes more than 20% greater than the reinforcing fiber volume fraction Vpf of the preform, then the adhesive resin adhesed to the surface of the reinforcing fiber base material will fall away and may become positioned inside the matrix resin or intermix with the matrix resin. If the adhesive resin is contained inside the matrix resin, there is concern that a large quantity of adhesive resin may be discharged along with the discharge of the matrix resin.

In this way, the discharge of adhesive resin accompanying the discharge of matrix resin does not pose a problem, as the adhesive resin does not function as an element constituting the FRP and only functions to improve handling and other features of the reinforcing fiber base material laminate and/or the preform until the FRP is molded. However, in the case where it is anticipated that the adhesive resin will realize functions such as improving the impact resistance of the FRP, such discharge is not preferable.

On the other hand, in the case where the adhesive resin is not expected to function as an element constituting the FRP and functions only to improve the handling and other features of the reinforcing fiber base material and/or the preform until the FRP is molded, a preferable embodiment involves heating the matrix resin and the preform so as to cause the adhesive resin to fall away from the surface of the reinforcing fiber base material or intermix with the matrix resin, and then actively discharging the adhesive resin along with the matrix resin. As described above, the adhesive resin easily forms spaces between the layers of reinforcing fiber base material constituting the FRP. While this improves the impact resistance of the FRP, there is also concern that improvement in the reinforcing fiber volume fraction Vf of the FRP will be impaired, as well as concern that improvement in compression and/or tensile characteristic due to the FRP having a high reinforcing fiber volume fraction Vf will be impaired. For this reason, by actively discharging the adhesive resin, suppressing increases in inter-laminar thickness, and increasing the reinforcing fiber volume fraction Vf, it is possible to improve compression and/or tensile characteristics.

In addition, matrix resin is injected into the preform, and after discharging the matrix resin from a vacuum suction port, injection of matrix resin from the injection port is terminated, and vacuum suction is applied from a suction port connected to the injection port. It is preferable to conduct the above so as to adjust the amount of matrix resin discharged from the suction port connected to the injection port and the conventional vacuum suction port, such that the reinforcing fiber volume fraction Vf of the FRP is between 45% and 72%.

It is preferable to suction and discharge matrix resin from a suction port connected to the injection port in addition to a conventional vacuum suction port, as doing so allows the matrix resin discharge time to be shortened.

In addition, in the case of suctioning and discharging matrix resin from only the conventional vacuum suction port, while matrix resin impregnated in the preform at locations near the vacuum suction port is easily suctioned, matrix resin impregnated in the preform near the injection port is not easily suctioned, and thus discharging is difficult. As a result, there is concern that the reinforcing fiber volume fraction of the FRP at locations near the injection port will become lower than the reinforcing fiber volume fraction of the FRP at locations near the vacuum suction port. For this reason, it is preferable to also suction and discharge matrix resin from a suction port connected to the injection port after injecting matrix resin into the preform, as doing so alleviates irregularities in the reinforcing fiber volume fractions at respective locations on the FRP.

EXAMPLES

Hereinafter, the present invention will be described in further detail with the use of embodiments and comparative examples.

The values of the parameters are solved for using the following methods.

(1) Preform Reinforcing Fiber Volume Fraction Vpf

The sample size is taken to be 300 mm×300 mm, a preform is produced as described in each of the following exemplary embodiments, and the preform reinforcing fiber volume fraction Vpf is solved for as described below.

The material weight F (g/m$^2$) is measured as follows.

After cutting the material to 125 mm×125 mm and removing the vertical and horizontal auxiliary fibers using tweezers, the cut material is placed in a vessel containing methylene chloride, and immersed in methylene chloride to dissolve and remove the adhesive resin adhesed to the material. After dissolution and removal of the adhesive resin, the material is dried for one hour at 110° C.±5° C. inside a drier, and then cooled to room temperature inside a desiccator. The weight W (g) of the cooled material is weighed to units of 0.1 g using an electronic scale, and the material weight is evaluated as F (g/m$^2$)=W (g)/0.125×0.125 (m$^2$).

The reinforcing fiber density $\rho$ (g/cm$^3$) is the density of the reinforcing fiber filaments used in the material, and is measured in conformity to method A of JIS R 7603.

The preform thickness t (mm) is measured by first placing the preform in a mandrel, sealing with bag film, and evacuating the sealed space. While the preform is subject to atmospheric pressure, a height gauge and micrometer are used to measure to units of 0.01 mm the thickness of the preform at five locations: the center and the four corners. The thickness at the center of the preform is measured by first measuring the height at the center position of the preform from the top of the bag film while the preform is subject to atmospheric pressure, and then subtracting the already-measured values for the height of the mandrel and the thickness of the bag film therefrom. The thicknesses at the four corners of the preform are measured by first using a micrometer to measure the combined thickness of the mandrel, the preform, and the bag film while the preform is subject to atmospheric pressure, and then subtracting the already-measured values for the thickness of the mandrel and the thickness of the bag film therefrom.

The preform reinforcing fiber volume fraction Vpf is solved for by using the material weight F (g/m$^2$), number of material layers p (sheets), reinforcing fiber density $\rho$ (g/cm$^3$), and preform thickness t (mm) as measured by the above methods to evaluate Vpf=F×p/$\rho$/t/10(%) at the five locations where the preform thickness was measured, the average value of the five locations being taken as the preform reinforcing fiber volume fraction Vpf.

FRPs are produced as described in the exemplary embodiments, and the FRP reinforcing fiber volume fractions Vf therefor are solved for as follows. The material weight F and the reinforcing fiber density $\rho$ are identical to the above.

The FRP thickness (mm) is measured to units of 0.01 mm using a micrometer after removing an FRP from the mold. The FRP thickness is measured at three locations: in the vicinity of the epoxy resin injection port, in the vicinity of the vacuum suction port, and a location centrally positioned between the injection port and the vacuum suction port.

The FRP reinforcing fiber volume fraction Vf is solved for by using the material weight F (g/m²), number of material layers p (sheets), reinforcing fiber density ρ (g/cm³), and FRP thickness t (mm) as measured by the above methods to evaluate $Vf = F \times p/\rho/t/10$ (%).

(2) FRP Reinforcing Fiber Volume Fraction Vf
The FRP reinforcing fiber volume fraction Vf is solved for using the methods herein described.

(3) Length L Whereby an Auxiliary Fiber Crosses a Single Reinforcing Fiber Filament
The length L is solved for using the methods herein described.

(4) Width H of Reinforcing Fiber Filaments
The width H is solved for using the methods herein described.

(5) In-Plane Shear Strain θ
The in-plane shear strain θ is solved for using the methods herein described.

Example 1

A unidirectional, non-crimping carbon fiber woven fabric having a carbon fiber weight of 190 g/m² was produced and used as the unidirectional reinforcing fiber base material. For the reinforcing fiber filaments, essentially untwisted carbon fiber filaments were used as the vertical fibers, the carbon fiber filaments having a filament count of 24,000, a width of 5.4 mm, a tensile strength of 5.8 GPa, a tensile elastic modulus of 290 GPa, and an amount of adhering sizing agent equal to 0.5 wt %. For the vertical auxiliary fibers, 22.5 dtex glass fibers having a coupling agent adhesed thereto and covered with 17 dtex refined nylon 66 covering fibers at 250 twists per meter were used. For the horizontal auxiliary fibers, essentially untwisted, refined, 17 dtex nylon 66 filaments were used. The woven density of the carbon fiber filaments and the vertical auxiliary fibers were both 1.84 strands/cm, the woven density of the horizontal auxiliary fibers was 3 strands/cm, and the length L whereby a horizontal auxiliary fiber crosses a single carbon fiber filament was 5.6 mm.

The amount of in-plane shear strain θ as shown in FIG. 4 was measured for the carbon fiber woven fabric as follows. First, the carbon fiber woven fabric was cut into a 100 mm×100 mm square (cut such that the sides of the square were respectively parallel and perpendicular to the carbon fiber filaments) and then placed upon the stage of an optical microscope. Observing the carbon fiber woven fabric at 25× magnification, the shape of the carbon fiber woven fabric was adjusted such that the horizontal auxiliary fibers were at right angles to the carbon fiber filaments and without slack. Next, a single carbon fiber filament was fixed in place, and an adjacent carbon fiber filament was slid upward to create in-plane shear strain. Upon sliding the carbon fiber filament, horizontal fibers that had been arranged at right angles with respect to the arranged direction of the two carbon fiber filaments became slanted with respect to the layout of the carbon fiber filaments. In addition, the gap between the carbon fiber filaments became narrower, and ultimately the carbon fiber filaments came into contact with each other. This state was photographed, and the result of measuring the angle θ formed by a slanting horizontal fiber and a line orthogonal to the arranged direction of the carbon fiber filaments was θ=15°.

For the adhesive resin, 27 g/m² of pellets were scattered over the surface of the woven fabric, the pellets having a median diameter of 120 μm and containing a thermoplastic resin with a glass transition temperature of 70° C. The pellets were then adhesed to the surface of the woven fabric by heating to 200° C., thereby producing a woven fabric base material. The median diameter herein is the median diameter acquired from the particle size distribution measured using a laser scattering particle size distribution analyzer.

This woven fabric base material was cut into sheets of woven fabric 1 m in width, 1 m in length, and having fiber orientation angles of 45°, 0°, −45°, and 90°. A laminate was then prepared by successively laminating these sheets in the order 45°, 0°, −45°, 90°, 90°, −45°, 0°, and 45°. The laminate was placed upon a flat plate of aluminum alloy and heated by insertion into an oven having an internal temperature of 80° C. After thorough heating, an aluminum alloy press-bonding jig was placed upon the laminate, each single pressure point of the jig having a cross sectional area of 1 mm² and a pitch of 10 mm. In addition, a load was placed upon the press-bonding jig such that the pressure applied to a single pressure point was 0.1 MPa, thereby applying pressure to the laminate at the locations corresponding to the pressure points of the press-bonding jig. As a result, the adhesive resin adhesed to the surface of the woven fabric base material bonded woven fabric base material together at the pressure points throughout the direction of thickness.

After bonding, the laminate was removed from the oven and cooled by being left at room temperature, and thus a laminate of carbon fiber woven fabric base material was obtained.

Example 2

The laminate obtained in Example 1 was placed in an iron mandrel having a partially spherical shape of curvature 800 mm and a chord having two-dimensional curvature of length 350 mm, and then covered with silicon rubber of thickness 1.5 mm. After sealing the edges of the silicon rubber to the mandrel using sealant, the space formed by the mandrel and the silicon rubber was evacuated with a vacuum pump, and the laminate was pressed and draped form by the mandrel.

The laminate was then inserted into an oven while still subject to pressure by the mandrel and then heated at a temperature of 80° C. for two hours, thereby causing the sheets of carbon fiber woven fabric base material to bond together. Subsequently, the laminate was removed from the oven and cooled to room temperature, and thus a preform was obtained. After peeling off the silicon rubber from the mandrel, the preform was covered again with a bagging film, and the edges of the bagging film were sealed to the mandrel using sealant. Subsequently, the space formed by the mandrel and the bagging film was evacuated with a vacuum pump, thereby applying vacuum pressure to the preform. While the preform was subject to vacuum pressure, the height from the top of the bagging film was measured using a height gauge. By subtracting the thickness of the mandrel and the bagging film, the thickness of the preform was measured. Measuring the preform reinforcing fiber volume fraction Vf resulted in a preform reinforcing fiber volume fraction Vpf of 52%.

The obtained preform exhibited no wrinkles over the entire surface thereof, the layers of carbon fiber woven fabric base material were bonded together, and the preform favorably retained the mandrel shape.

Example 3

A preform was produced identically to Example 2, except that the mandrel used was an iron mandrel having a partially spherical shape of curvature 400 mm and a chord having two-dimensional curvature length of 350 mm. Similarly to Example 2, measuring the preform reinforcing fiber volume fraction Vpf of the preform resulted in a preform reinforcing fiber volume fraction Vpf of 52%.

The obtained preform exhibited no wrinkles over the entire surface thereof, the layers of carbon fiber woven fabric base material were bonded together, and the preform favorably retained the mandrel shape.

Example 4

The preform produced in Example 2 was placed into a mold, injected with epoxy resin, and RTM was conducted.

The injection of epoxy resin was conducted until the entire preform was impregnated with epoxy resin. After discharging epoxy resin from a vacuum suction port, the injection port was closed and injection of epoxy resin was terminated. The injection port was then connected to the vacuum suction line and evacuation was conducted together with the conventional vacuum suction port, and excess injected epoxy resin was discharged.

The discharging of epoxy resin from the conventional vacuum suction port and the vacuum suction port prepared by newly connecting the injection port to the vacuum suction line was conducted until the measured thickness of the preform impregnated with epoxy resin reached a thickness equivalent to a post-molding reinforcing fiber volume fraction Vf of 55%. Measurement of the thickness of the preform impregnated with epoxy resin was conducted by measuring three locations: the vicinity of the injection port, the vicinity of the vacuum suction port, and a location centrally positioned between the injection port and the vacuum suction port.

After discharging the epoxy resin, the preform impregnated with epoxy resin was subjected to a first hardening for two hours at a temperature of 130° C., and subsequently a second hardening for two hours at a temperature of 180° C., and thus RTM was conducted.

The thickness of the obtained carbon fiber-reinforced plastic was measured at three locations: the vicinity of the injection port, the vicinity of the vacuum suction port, and a location centrally positioned between the injection port and the vacuum suction port. Measuring the FRP reinforcing fiber volume fraction Vf resulted in a uniform FRP reinforcing fiber volume fraction Vf of 55% at all locations. No obvious wrinkles or serpentine fibers were found upon inspection of the surface appearance, the FRP having favorable surface quality. Furthermore, no defects such as serpentine fibers, voids, or gaps were found upon cutting the carbon fiber reinforced plastic and inspecting the cross section, the FRP being in a sufficiently usable state as a structural material.

Example 5

RTM similar to that of Example 4 was conducted using the preform produced in Example 3, thereby obtaining a carbon fiber reinforced plastic. Similarly to Example 4, measuring the FRP reinforcing fiber volume fraction Vf resulted in a uniform FRP reinforcing fiber volume fraction Vf of 55% at all locations. No obvious wrinkles or serpentine fibers were found upon inspection of the surface appearance, the FRP having favorable surface quality. Furthermore, no defects such as serpentine fibers, voids, or gaps were found upon cutting the carbon fiber reinforced plastic and inspecting the cross section, the FRP being in a sufficiently usable state as a structural material.

Comparative Example 1

A unidirectional, non-crimping carbon fiber woven fabric having a carbon fiber weight of 190 g/m² was produced as follows. Only carbon fiber reinforcing filaments and horizontal fibers identical to those of Example 1 were used, without using vertical auxiliary fibers. The density of the horizontal fibers was 3 strands/cm, and the length whereby a horizontal fiber crosses a single carbon fiber filament was 5.4 mm, thus essentially preventing the occurrence of gaps between carbon fiber filaments.

The amount of in-plane shear strain of the carbon fiber woven fabric was measured similarly as in Example 1. However, since the weave was such that no gaps exist between the carbon fiber filaments, the measurement results found that the carbon fiber filaments were immovable, even if in-plane shear strain is induced. When forcibly strained, adjacent carbon fiber filaments squashed together, and ultimately generated wrinkles as a result.

Thermoplastic resin was adhered to the surface of the woven fabric similarly as in Example 1, thereby producing a woven fabric base material.

Comparative Example 2

A laminate similar to that of Example 1 was prepared using the woven fabric base material obtained in Comparative Example 1. Similarly, a press-bonding jig was used to bond layers of woven fabric base material together throughout the direction of thickness, thereby obtaining a laminate.

This laminate was then used to produce a preform similarly as in Example 2. The quality of the preform was poor, the preform having prominent wrinkles formed at two locations at the edge of the laminate, with fiber bending confirmed at the wrinkled portions.

Comparative Example 3

RTM was conducted similarly as in Example 4 using the preform obtained in Comparative Example 3.

The shape of the wrinkles from the wrinkled portions of the preform remained in the molded fiber-reinforced plastic. The existence of portions and gaps in the wrinkled portions was confirmed, wherein the component ratio of resin was markedly large compared to locations where reinforcing fibers were correctly present.

Measuring the thickness of the fiber-reinforcing plastic and solving for the FRP reinforcing fiber volume fraction Vf similarly as in Example 4 resulted in an FRP reinforcing fiber volume fraction of 55% for locations other than the wrinkled portions. On the other hand, since the existence of portions and gaps in the wrinkled portions wherein the component ratio of resin was markedly large compared to locations where reinforcing fibers were correctly present was confirmed, evaluation of the reinforcing fiber volume fraction at the wrinkled portions was not possible.

What is claimed is:

1. A preform formed by draping a planar reinforcing fiber base material laminate,
   the planar reinforcing fiber base material laminate formed by laminating a plurality of layers of a unidirectional reinforcing fiber base material,
   the unidirectional reinforcing fiber base material comprising a weave of reinforcing fiber filaments arranged in parallel in a single direction, and auxiliary fibers arranged wherein a length L whereby an auxiliary fiber arranged in at least one other direction crosses a reinforcing fiber filament of the weave of reinforcing fiber filaments, a width H of the reinforcing fiber filament, and an in-plane shear strain θ exist in a relationship expressed by equations (I) and (II) below, and additionally, wherein an adhesive resin having a glass transition temperature Tg between 0° C. and 95° C. is adhesed to a surface of the unidirectional reinforcing fiber base material on at least one side thereof, an amount of adhesive resin being between 2 g/m² and 40 g/m² and adhesed in spots, lines, or discontinuous lines, $$L = H/\cos\theta \quad (I),$$

$$3° \leq \theta \leq 30° \quad (II),$$

wherein the adhesive resin adhesed to each layer of the unidirectional reinforcing fiber base material partially bonds to a facing layer of the reinforcing fiber base material over the entire surface thereof, and additionally, wherein a maximum length of each bonding joint is not less than 1 mm and not greater than the width H of the reinforcing fiber filament, wherein the preform has a reinforcing fiber volume fraction Vpf in a range of 45% to 62%.

2. The preform according to claim 1, wherein the spacing between respective bonding joints is not less than the width H of the reinforcing fiber filament and not greater than 100 mm.

3. The preform according to claim 1, wherein the layers of reinforcing fiber base material are bonded together by the adhesive resin over their entire surfaces.

4. A fiber-reinforced, molded plastic product, obtained by injecting, impregnating, and hardening a matrix resin into the preform according to claim 1, wherein the reinforcing fiber volume fraction Vf of the molded plastic product is in a range of 45% to 72%.

* * * * *